(12) United States Patent
Jeong et al.

(10) Patent No.: US 10,772,031 B2
(45) Date of Patent: Sep. 8, 2020

(54) MEASUREMENT APPARATUS AND METHOD FOR THE COMMUNICATION OF AN IDLE MODE DEVICE HAVING LOW MOBILITY IN A MOBILE COMMUNICATION SYSTEM

(71) Applicant: Samsung Electronics Co., Ltd., Suwon-si, Gyeonggi-do (KR)

(72) Inventors: Kyeong In Jeong, Hwaseong-si (KR); Soeng Hun Kim, Suwon-si (KR); Jung Soo Jung, Seongnam-si (KR); Sang Bum Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 16/401,556

(22) Filed: May 2, 2019

(65) Prior Publication Data
US 2019/0261250 A1    Aug. 22, 2019

Related U.S. Application Data

(63) Continuation of application No. 13/521,511, filed as application No. PCT/KR2011/000245 on Jan. 13, 2011, now Pat. No. 10,313,959.

(30) Foreign Application Priority Data

Jan. 15, 2010    (KR) .................... 10-2010-0004052

(51) Int. Cl.
*H04W 48/08*        (2009.01)
*H04W 24/10*        (2009.01)
(Continued)

(52) U.S. Cl.
CPC ............. *H04W 48/08* (2013.01); *H04W 4/08* (2013.01); *H04W 4/70* (2018.02); *H04W 24/10* (2013.01)

(58) Field of Classification Search
CPC ............... H04W 72/005; H04W 72/04; H04W 72/0413; H04W 72/042; H04W 72/0453;
(Continued)

(56) References Cited

U.S. PATENT DOCUMENTS

| 2005/0119008 A1 | 6/2005 | Haumont |
| 2007/0004445 A1 | 1/2007 | Dorsey et al. |

(Continued)

FOREIGN PATENT DOCUMENTS

| KR | 10-2009-0117570 A | 11/2009 |
| KR | 10-2009-0121446 A | 11/2009 |

OTHER PUBLICATIONS

3GPP TS 22.368 V1.1.1, 3rd Generation Partnership Project; Technical Specification Group Services and System Aspects; Service requirements for machine-type communications; Stage 1 (Release 10), Nov. 2009.

(Continued)

*Primary Examiner* — Natasha W Cosme
(74) *Attorney, Agent, or Firm* — Jefferson IP Law, LLP

(57) ABSTRACT

The present invention defines an efficient measurement method for idle mode M2M/MTC device with low/no mobility in a mobile communication system. An example of the mobile communication system to which the present invention is application is 3GPP UMTS mobile communication system and 3GPP LTE/LTE-A mobile communication system as the next generation mobile communication system under discussion in 3GPP.

20 Claims, 15 Drawing Sheets

(51) Int. Cl.
*H04W 4/08* (2009.01)
*H04W 4/70* (2018.01)

(58) Field of Classification Search
CPC ......... H04W 72/12; H04W 8/02; H04W 8/04; H04W 12/04; H04W 16/02; H04W 16/26; H04W 24/02; H04W 24/10; H04W 28/02; H04W 28/06; H04W 28/20; H04W 28/26; H04W 36/0072; H04W 36/04; H04W 36/18; H01L 31/02363; H01L 31/074; H01L 35/22; H01L 51/0034; H01L 51/0036; H01L 51/0043; H01L 51/0048; H01L 51/0074; H01L 51/0512; H01L 51/0529; H01L 51/102; H01L 51/4253; H01L 51/445; H01L 51/5012
USPC ...................................... 455/425, 450, 456.1
See application file for complete search history.

(56) References Cited

U.S. PATENT DOCUMENTS

| | | |
|---|---|---|
| 2007/0298725 A1 | 12/2007 | Ryu |
| 2009/0088154 A1* | 4/2009 | Umatt .................. H04W 48/16 455/434 |
| 2009/0156196 A1 | 6/2009 | Somasundaram et al. |
| 2010/0099402 A1 | 4/2010 | Wu |
| 2010/0285816 A1* | 11/2010 | Vos ....................... H04W 60/04 455/456.1 |
| 2011/0065467 A1 | 3/2011 | Park et al. |
| 2011/0070869 A1 | 3/2011 | Ryu |
| 2011/0201343 A1 | 8/2011 | Pinheiro et al. |
| 2011/0312347 A1 | 12/2011 | Dinan |
| 2012/0218889 A1 | 8/2012 | Watfa et al. |
| 2015/0024775 A1 | 1/2015 | Jung et al. |

OTHER PUBLICATIONS

3GPP TS 23.888 V0.1.0, 3rd Generation Partnership Project; Technical Specification Group Services and System Aspects; Service Improvements for machine-type communications; (Release 10), Dec. 2009.

3GPP TS 22.868 V8.0.0, 3rd Generation Partnership Project; Technical Specification Group Services and System Aspects; Study on Facilitating Machine to Machine Communication in 3GPP Systems; (Release 10), Mar. 2007.

Fujitsu, "RAN Impacts of machine-type communications for UTRA and EUTRA", 3GPP TSG RAN WG2 Meeting #68bis, R2-100412, Jan. 18-22, 2010.

European Search Report dated Jun. 30, 2020; European Appln. No. 11 733 085.2-1215.

* cited by examiner

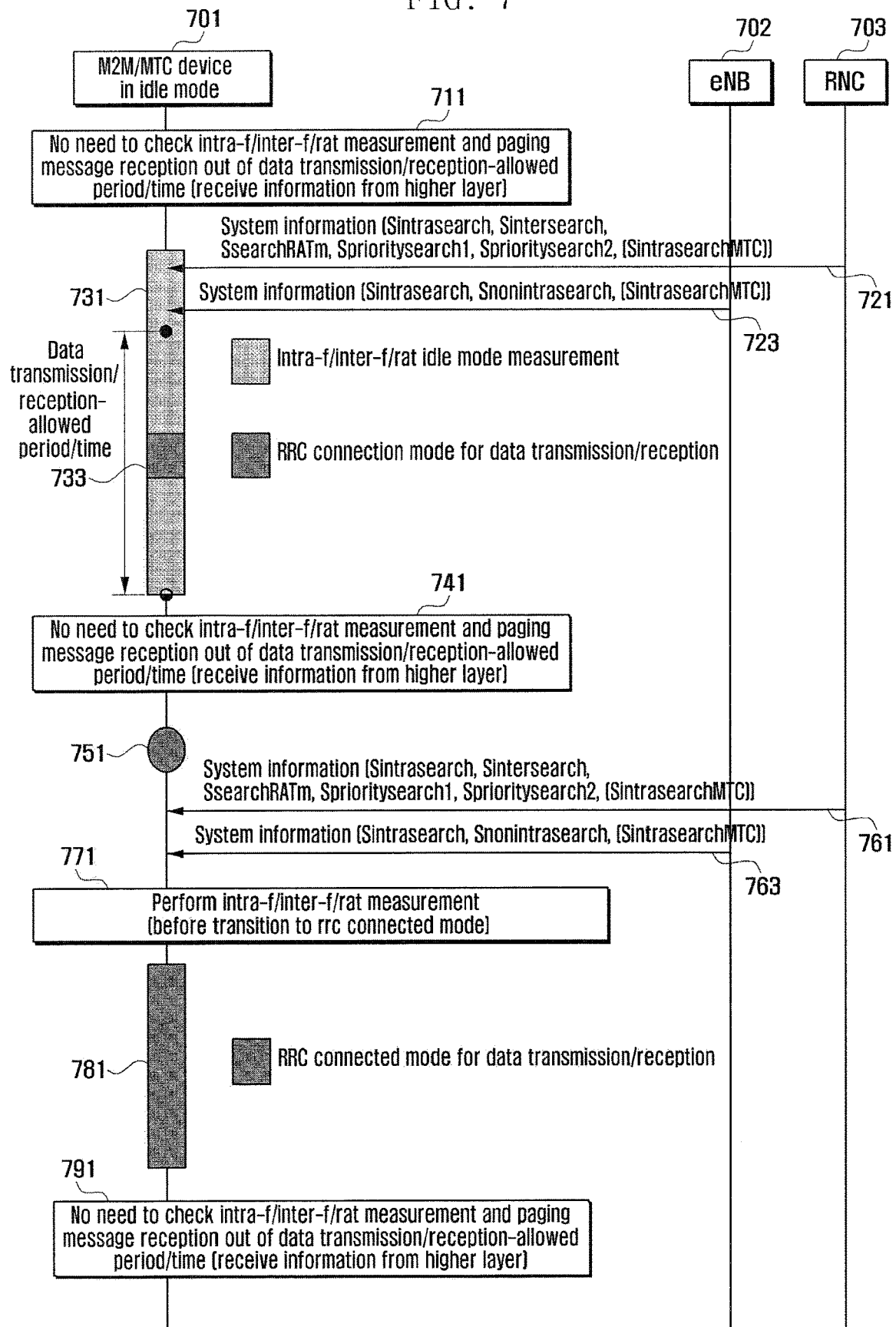

MEASUREMENT APPARATUS AND METHOD FOR THE COMMUNICATION OF AN IDLE MODE DEVICE HAVING LOW MOBILITY IN A MOBILE COMMUNICATION SYSTEM

CROSS-REFERENCE TO RELATED APPLICATION(S)

This application is a continuation application of a U.S. National Stage application Ser. No. 13/521,511, filed on Jul. 11, 2012 under 35 U.S.C. § 371 of an International Application filed on Jan. 13, 2011 and assigned application number PCT/KR2011/000245, which was based on and claimed the benefit of a Korean Patent Application number 10-2010-0004052, filed on Jan. 15, 2010, in the Korean Intellectual Property Office, the disclosure of each of which is incorporated by reference herein in its entirety.

BACKGROUND OF THE INVENTION

Field of the Invention

The present invention relates to a measurement apparatus and method of a mobile communication system and, in particular, to a measurement apparatus and method for communication of a low mobility device.

Description of the Related Art

Mobile communication systems have developed to provide the subscribers with voice communication services on the move. With the advance of technologies, the mobile communications have been evolved to support high speed data communication services as well as the standard voice communication services. Recently, as one of the next generation Universal Mobile Telecommunication System (UMTS) mobile communication system, Long Term Evolution (LTE) is on the standardization by the 3rd Generation Partnership Project (3GPP). LTE is a technology designed to provide high speed packet-based communication of up to 100 Mbps higher than the data rate of the legacy system.

Meanwhile, many discussions are being conducted for providing diverse services in the UMTS/LTE mobile communication system. M2M/MTC is one of the representative technologies under discussion. Machine To Machine/Machine Type Communication (M2M/MTC) denotes the communication between electronic devices or between electronic device and data server through a mobile communication network. The M2M/MTC technology is applicable to the automotive telematics, logistics management, intelligent metering system, remote asset management system, Point-Of-Sale (POS), and security-related field. The M2M/MTC device (e.g. metering system) is likely to have low mobility as compared to the normal mobile phone. There is therefore a need of modifying the procedures specified for the normal mobile phones operating in the mobile communication system.

FIG. 1 is a diagram illustrating a structure of a 3GPP UMTS mobile communication system.

Referring to FIG. 1, the User Equipment (UE) 101 is a terminal or a subscriber connected to a Node B (NB) 105 through a radio link to participate in radio communication. The NBs 105, 110, 115, 120, 125, or 130 are the radio base station apparatuses directly responsible for communication with UEs and manage the corresponding cells. The Radio Network Controllers (RNCs) 140 and 150 control the NBs and radio resources. The RNCs 140 and 145 connect to the Packet Switched or Packet Service (PS) network via the Serving GPRS Support Node (SGSN) 150. The RNCs 140 and 145 and SGSN 150 are connected through Iu-PS interface and exchange packet-switched control signal. The SGSN 150 is responsible for various control functions and mobility management for the idle mode terminals. The SGSN 150 is also responsible for the data related to the subscriber's service billing and controls communication to exchange data with the UE 101 through the Serving RNC (SRNC) of the UE 101. The Serving Gateway (S-GW) 160 is the apparatus for providing data bearer and allocates and releases the data bearer under the control of the SGSN 150.

FIG. 2 is a diagram illustrating a structure of the 3GPP LTE mobile communication system.

Referring to FIG. 2, the radio access network of the LTE mobile communication system includes Evolved Node Bs (eNB or Node B) 205, 210, 215, and 220; Mobility Management Entity (MME) 225; and Serving Gateway (S-GW) 230. The User Equipment (UE) 235 connects to an external network through the eNB 205 and S-GW 230. Each of the eNBs 205 corresponds to an entity combining the legacy Node B and RNC of the UMTS system. The UE 235 connects to one of the eNBs 205 to 220 through a radio channel and each eNB is responsible for the complicated functions as compared to the legacy Node B. In LTE, since all user traffics including the traffic of real time service such as Voice over IP (VoIP) are served through a shared channel, there is a need of a device for collecting the status information of the UEs to schedule the UEs, and the eNBs 205 to 220 are responsible for this function. The eNBs 205 to 220 are also responsible for controlling radio resource of the corresponding cells. Typically, an eNB controls plural cells. In order to secure the data rate of up to 100 Mbps, LTE adopts Orthogonal Frequency Division Multiplexing (OFDM) as radio access technology on the 20 Mhz bandwidth. LTE also adopts Adaptive Modulation and Coding (AMC) for determining the modulation and channel coding rate in adaptation to the channel condition of the UE. The S-GW 230 is the entity for providing data bearers so as to establish or release data bearer under the control of the MME 225. The MME 225 is the entity responsible for various control functions and mobility management of the idle mode UEs, in connection with the eNBs.

FIGS. 3a to 3c are diagrams illustrating the idle mode UE management method in the 3GPP UMTS/LTE mobile communication system.

Referring to FIGS. 3a to 3c, reference number 301 of FIG. 3a denotes a legacy UE such as mobile phone, reference number 302 denotes an eNB of the LTE mobile communication system, and reference number 303 denotes an RNC of the UMTS mobile communication system. In FIG. 3a, reference numbers 311 and 313 denote signaling RNC/eNB-related information for supporting efficient management of the legacy idle mode UEs in the UMTS/LTE mobile communication system. Reference numbers 321 to 327 of FIG. 3b denote details of measurement method of the legacy UE in the UMTS mobile communication system, and reference number 331 to 335 of FIG. 3c denote details of the measurement method of the legacy UE in the LTE/UMTS mobile communication system. The measurement method denoted by reference numbers 331 to 335 of FIG. 3c can be applied to the UMTS mobile communication system as well as the LTE mobile communication system, and the UMTS system signals the indication information indicating whether the measurement method denoted by reference numbers 321 to 327 or the measurement method denoted by reference numbers 331 to 335 is applied and configuration information related thereto.

In the UMTS mobile communication system, the RNC configures the informations for supporting the measurement of the legacy idle mode UEs into system information and broadcasts the system information within the cell. Here, the idle mode UE denotes the UE having no Radio Resource Control (RRC) connection with the RNC. In the UMTS mobile communication system, such informations include Sintrasearch, Sintersearch, SsearchRATm, Sprioritysearch1, and Sprioritysearch2. The roles of these informations are described with reference to reference numbers 321 to 327 of FIG. 3b and reference numbers 331 to 335 of FIG. 3c.

In the LTE mobile communication system, the eNB configures the informations for supporting the measurement of the legacy idle mode UE into the system information and broadcasts the system information within the cell at step 313. Here, the idle mode UE means the UE having no RRC connection with the eNB. The system information of the LTE mobile communication system is capable of including Sintrasearch and Snonintrasearch informations. The roles of these informations are described with reference to reference numbers 331 to 335 of FIG. 3c.

Upon receipt of the system information, the idle mode UE of the UMTS mobile communication system performs the measurement procedure 321 to 327 or 331 to 335. The UMTS system information includes the information indicating the measurement operation to be executed. If it is indicated to execute the UE measurement procedure of steps 321 to 327, the system information includes Sintrasearch, Sintersearch, and SsearchRATm informations. If these informations are received in the system information, the idle mode UE of the UMTS mobile communication system compares the measurement value of the radio signal of the current serving cells with the reference threshold values received in the system information. The measurement value of the radio strength of the serving cell can be the value of the received signal power to the serving cell's reference channel or LTE mobile communication system's Reference Signal (RS) or the value of the received quality of the reference channel of the serving cell to the entire interference. Here, the reference channel can be Common Pilot Channel (CPICH) of the UMTS system and Reference Signal (RS) of the LTE system. Also, the received signal power of the reference channel of the serving cell as the measurement can be Received Signal Code Power (RSCP) of the UMTS system and the Reference Signal Received Power (RSRP) of the LTE system. Also, as an example of the measurement, the received signal quality of the serving cell's reference channel to the entire interference is Ec/No of the UMTS system and Reference Signal Received Quality (RSRQ) of the LTE system. The CPICH RSCP/CPICH Ec/No or RSRP/RSCP of the UMTS mobile communication system and LTE mobile communication system are specified in the 3GPP standard TS25.215/TS36.214.

The radio signal strength measurement value of the serving cell can be measured as the reference channel received power of the serving cell or the received signal quality of the serving cell's reference channel to the entire interference, and the two measurements can be signaled as specific values. For example, the when using the RSCP measurement value of the reference channel of UMTS, the measurement value can be signaled as Sintrasearch1, Sintersearch2, and SsearchRATm1 values; and when using the Ec/No measurement value of the reference channel, the measurement value can be signaled as Sintrasearch, Sintersearch, and SsearchRATm.

If the Sx of the current serving cell is (equal to or) greater than the Sintrasearch value as denoted by reference number 321 of FIG. 3b, the idle mode UE of the UMTS mobile communication system skips the intra-frequency (herein after the term "Intra-F" is used interchangeably) measurement process and, otherwise if the Sx of the current serving cell is (equal to or) less than the Sintrasearch value as denoted by reference numbers 323, 325, and 327, performs the intra-frequency measurement process. Also, if the Sx of the current serving cell is (equal to or) greater than the Sintersearch value as denoted by reference number 321 and 323, the idle mode UE skips the inter-Frequency (hereinafter, the term 'Inter-F' is used interchangeably) measurement process and, otherwise if Sx of the current serving cell is (equal to or) less than the Sintersearch value as denoted by reference numbers 325 and 327, performs the inter-Frequency measurement. Furthermore, if Sx of the current serving cell is (equal to or) greater than SsearchRATm value of a specific system m as denoted by reference numbers 321, 323, and 325, the idle mode UE skips Inter-Radio Access Technology (hereinafter, the term 'Inter-RAT' is used interchangeably) measurement process and, otherwise if Sx of the current cell is (equal to or) less than SsearchRATm as denoted by reference number 327, performs the inter-RAT measurement process to the specific system m.

The LTE and some UMTS mobile communication systems adopt priority concept to frequency/system in order for the idle mode UE to perform the measurement and cell (re)selection in consideration of the priorities assigned to the frequencies/systems. Suppose that the current serving cell of the idle mode UE operates on frequency 2 with priority 2 and neighbor cells operate on frequency 1 with priority 1 and frequency 3 with priority 3. In this case, although the radio signal strength of the current serving cells is advantageous, the UE performs the inter-frequency measurement to the frequency 3 having the high priority as compared to the current serving cell's and, if a neighbor cell having the channel quality greater than a predetermined threshold value on the frequency 3, performs cell re(selection) on the frequency 3 and, if the radio signal strength of the current serving cell is advantageous, it is not necessary to perform the inter-frequency measurement on the frequency 1 having the low priority as compared to the frequency of the current serving cell. However, if the radio signal strength of the current serving cell falls below the threshold value, it becomes necessary for the UE to perform inter-frequency measurement on the frequency 1 and, if a neighbor cell having the radio signal strength greater than the threshold value on the frequency 1, performs cell (re)selection on the frequency 1.

Reference numbers 331 to 335 of FIG. 3c denote a measurement process of the idle mode UE in the UMTS mobile communication system and LTE mobile communication system adopting the frequency/system priority concept. If Sx of the current serving cell is (equal to or) greater than Sintrasearch value as denoted by reference number 331, the idle mode UE skips intra-frequency measurement and, otherwise if Sx of the current serving cell is (equal to or) less than Sintrasearch value as denoted by reference numbers 333 and 335, performs the intra-frequency measurement. Also, if Sx of the current cell is (equal to or) greater than Snonintrasearch (LTE) or Sprioritysearch1/Sprioritysearch2 (UMTS) as denoted by reference numbers 331 and 335, the idle mode UE skips inter-frequency/inter-RAT measurement process to the frequency/system having the priority equal to or less than that of the frequency of the current serving cell. If Sx of the current serving cell is (equal to or) less than Snonintrasearch (LTE) or Sprioritysearch1/Sprioritysearch2 (UMTS) as denoted by reference number 335, the idle mode UE performs inter-frequency/inter-RAT measurement process to the frequency/system having the priority to the frequency/system having the priority equal to or less than that of the frequency of the current serving cell.

However, the above-described measurement method is inefficient for the idle mode M2M/MTC device with low or no mobility. That is to say, it is inefficient to apply the measurement method designed for the legacy UE such as mobile phone having relatively high mobility to the idle mode M2M/MTC device having low mobility. This is because the conventional measurement method makes the M2M/MTC device perform measurement operation unnecessarily even though no movement is predicted. There is therefore a need of an efficient measurement method for the idle mode M2M/MTC device with low mobility.

DISCLOSURE OF INVENTION

Technical Problem

If the measurement method of the UE having relatively high mobility is applied to the idle mode M2M/MTC device having low or no mobility without modification, this is likely to cause inefficiency. This is because the measurement method performs measurement forcibly even when not movement is predicted so as to waste power. There is therefore a need of developing an efficient measurement method for idle mode M2M/MTC device with low mobility. Although the description is directed to the idle mode M2M/MTC device with low mobility, the present invention is applicable to other devices with low mobility.

Solution to Problem

In an embodiment of the present invention, a set of a limited number of cells where mobility of idle mode M2M/MTC devices with low mobility is predicted, and eNB/RNC generates a separate comparison value (additional threshold value) triggering intra-frequency/inter-frequency/inter-RAT measurement of the idle mode M2M/MTC devices with low mobility and broadcasts the additional threshold value in the form of system information.

The idle mode M2M/MTC device with low mobility compares Sx of the current serving cells with the broadcast comparison threshold value (reference threshold value) and the separate comparison value (additional threshold value) and performs, when Sx of the current serving cell is (equal to or) less than the comparison threshold value (reference threshold value) triggering intra-frequency/inter-frequency/inter-RAT measurement (i.e. has a value between the reference threshold and the additional threshold value), the intra-frequency/inter-frequency/inter-RAT measurement to the limited number of the cells wherein the mobility of the M2M/MTC device is predicted and, otherwise when Sx of the current serving cell is (equal to or) less than the separate comparison threshold value (additional threshold value) triggering the intra-frequency/inter-frequency/inter-RAT measurement of the M2M/MTC device with low mobility, the conventional intra-frequency/inter-frequency/inter-RAT measurement.

As an efficient measurement method of the M2M/MTC devices, the M2M/MTC device suspends the intra-frequency/inter-frequency/inter-RAT measurement out of data (transmission)reception-allowed period/time and performs the intra-frequency/inter-frequency/inter-RAT measurement in the data (transmission) reception-allowed period/time or when the data (transmission) reception-allowed period/time is arriving. The intra-frequency/inter-frequency/inter-RAT measurement is performed continuously while the M2M/MTC device is in idle mode until the data (transmission) reception-allowed period ends.

According to an embodiment of the present invention, a method for a base station to control measurements of communication devices in a mobile communication system includes collecting information on the communication devices with low mobility; configuring system information including a reference threshold value and an additional threshold value lower than the reference threshold for optimizing idle mode measurements of the communication devices through analysis of the collected information; and broadcasting the system information for the communication devices within a cell, wherein the additional threshold value is the threshold value for performing the measurement in a limited number of cells in which the mobility of the mobile devices is predicted.

Preferably, configuring system information includes analyzing the collected information to acquire a number of communication devices, the collected information including information on locations and number of the communication devices; configuring, when the number of communication devices is large, the system information with the reference threshold value and the additional threshold value; and configuring, when the number of communication device is small, the system information with the reference threshold value. Preferably, collecting information on the communication devices comprises receiving the information on the communication devices with low mobility from an O&M server or MME, and the communication devices are the communication devices between electronic devices or between an electronic device and a server.

In accordance with another embodiment of the present invention, A measurement method of a M2M/MTC device with low mobility in a mobile communication system includes receiving system information including a reference threshold value and an additional threshold value from a base station; generating a measurement value by measuring strength of a radio channel of a serving cell; and performing, when the measurement value is less than the reference threshold value and greater than the additional threshold value, the measurement to a small number of cells limited in mobility; and performing, when the measurement value is less than the additional threshold value, the measurement to entire cells.

Preferably, performing the measurement includes executing, when the measurement value is greater than the reference threshold value, measurement only to the serving cell.

Preferably, the reference threshold value and additional threshold value are the reference threshold values for intra-frequency or inter-frequency or inter-system measurement, and performing the measurement executing, when the reference threshold value and additional reference threshold value are the intra-frequency threshold values, the intra-frequency measurement; executing, when the reference threshold value and additional reference threshold value are the inter-frequency threshold values, the inter-frequency measurement; and executing, when the reference threshold value and additional reference threshold value are the inter-system threshold values, the inter-system measurement.

Preferably, the measurement value is one of a received signal power of a reference channel of the serving cell and a received signal quality of the reference channel of the serving cell to entire measured interference.

In accordance with another embodiment of the present invention, a measurement method of an M2M/MTC device in the mobile communication system includes checking a data communication-allowed period and whether a current time is before a start of a data communication-allowed period as much as a predetermined threshold time value; performing intra-frequency/inter-frequency/inter-system idle mode measurement only when the M2M/MTC device is in idle mode for the data communication-allowed period and the period before the start of a data communication-allowed period as much as a predetermined threshold time value; and skipping, when the current time is not the data communication-allowed period or the period before the start of a data communication-allowed period as much as a predetermined threshold time value, the intra-frequency/inter-frequency/inter-system measurement.

In accordance with another embodiment of the present invention, a measurement apparatus of a base station for M2M/MTC device communication in a mobile communication system includes a radio resource manager which manages resource of a set of a limited number of cells in which mobility of idle mode M2M/MTC devices with low mobility; a message generator which generates system information including basic measurement information and additional measurement information for triggering intra-frequency/inter-frequency/inter-system measurement for the idle mode M2M/MTC devices with low mobility; and a radio transceiver which broadcast the system information including the basic measurement information and additional measurement information.

In accordance with still another embodiment of the present invention, a measurement method of a terminal for M2M/MTC device communication in a mobile communication system includes a radio transceiver which receives system information including additional measurement information broadcast; and a measurement unit which compares a measurement value of a current serving cell with the additional measurement information and performs, when the measurement value Sx of the current serving cell is less than the additional measurement threshold value, intra-frequency/inter-frequency/inter-system measurement to a limited number of cells in which mobility of the M2M/MTC device is predicted.

Advantageous Effects

Through the measurement of the idle M2M/MTC devices according to embodiments of the present invention, it is possible reduce the reception time of the idle mode M2M/MTC device for measurement by limiting the number of cell for performing the measurement or suspending the measurement under specific conditions, thereby conserving the signal reception power of the M2M/MTC device efficiently.

BRIEF DESCRIPTION OF THE DRAWINGS

FIG. 7 shows another embodiment of the measurement method of idle mode M2M/MTC device in the mobile communication system proposed in the second embodiment of the present invention;

DETAILED DESCRIPTION OF EXEMPLARY EMBODIMENTS

Figure 1:
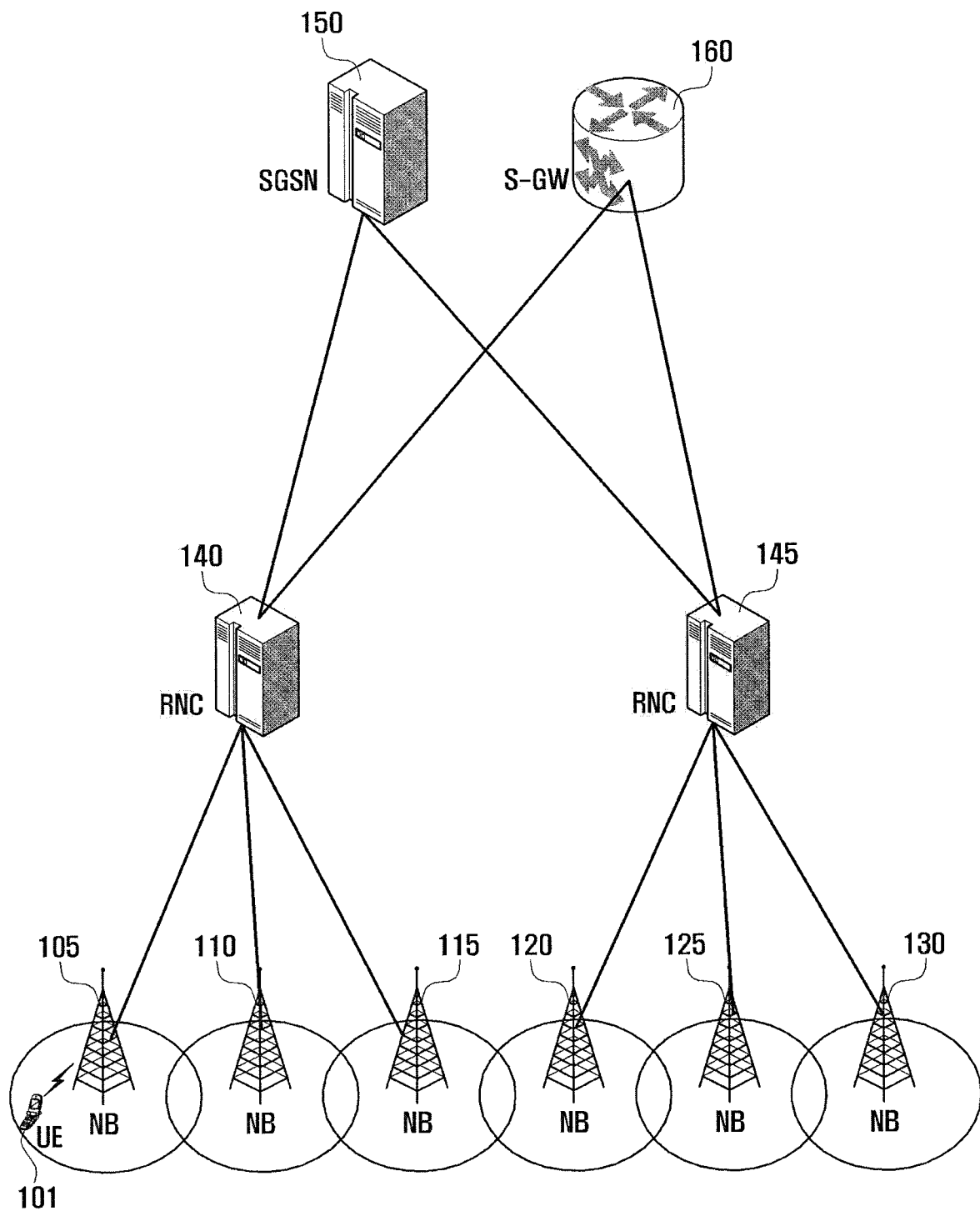
FIG. 1 is a diagram illustrating a structure of a 3GPP UMTS mobile communication system.
Figure 2:
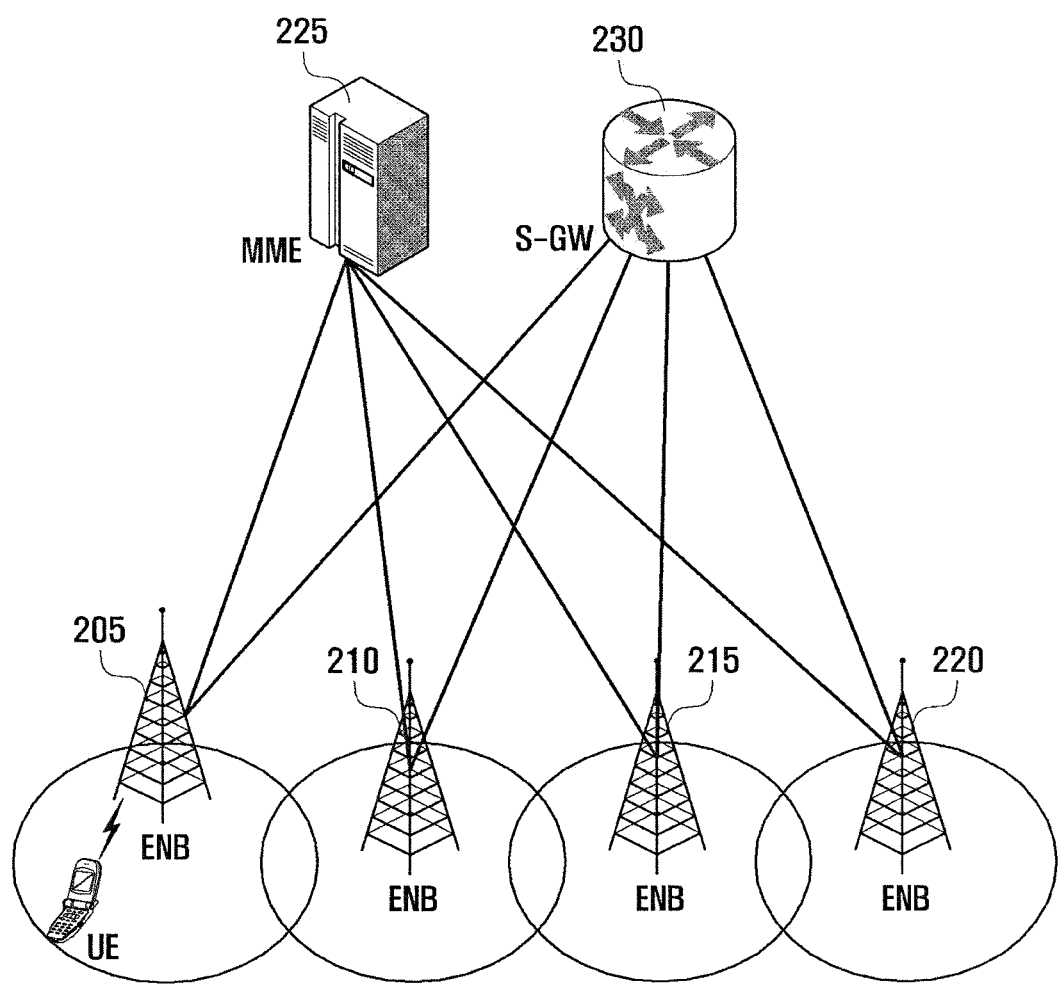
FIG. 2 is a diagram illustrating a structure of the 3GPP LTE mobile communication system.

Exemplary embodiments of the present invention are described with reference to the accompanying drawings in detail. The same reference numbers are used through the drawings to refer to the same or like parts. Detailed description of well-known functions and structures incorporated herein may be omitted to avoid obscuring the subject matter of the present invention.

An embodiment of the present invention proposes an efficient measurement method of an idle mode M2M/MTC device with low or no mobility.

In order to accomplish this, the first embodiment of the present invention defines a mobility set of cells in which potential mobility of the idle mode M2M/MTC devices with low mobility is predicted, allows eNB/RNC to configure a threshold value to trigger intra-frequency/inter-frequency/inter-RAT measurement of the idle mode M2M/MTC devices with low mobility, and broadcasts the threshold value as system information.

The idle mode M2M/MTC device with low mobility compares the Sx of the current serving cells and the broadcast comparative threshold (hereinafter, the term 'comparative threshold' is used interchangeably with the term 'reference threshold') and the separate comparative threshold (hereinafter, the term 'separate comparative threshold' is used interchangeably with the term 'additional threshold') and, if Sx of the current serving cell is (equal to or) less than the comparative threshold (i.e. reference threshold for triggering intra-frequency/inter-frequency/inter-RAT measurement (i.e. in the range between the reference threshold and additional threshold), performs the intra-frequency/inter-frequency/inter-RAT measurement in the cell restricting the mobility of the M2M/MTC device and, otherwise if the Sx of the current serving cell is (equal to or) less than the separate comparative threshold (i.e. additional threshold), performs the conventional intra-frequency/inter-frequency/inter-RAT measurement.

At this time, the idle mode M2M/MTC device with low mobility has to check that it is the idle mode M2M/MTC device with low mobility and acquires the information that the cells restricting the mobility of the M2M/MTC device.

The method for acquiring the information is to check the measurement result on radio of the M2M/MTC device, to receive from the higher layer in the M2M/MTC device, to receive OMA Device Management (DM) or Non Access Stratum (NAS) control message, or to map to the cells constituting the registered area of the idle mode (e.g. Routing Area (RA) of UMTS mobile communication system or Tracking Area (TA) of LTE mobile communication system and map the configuration implicitly. In the present invention, the idle mode M2M/MTC device with low mobility checks its own device type and does not rule out the other methods for acquiring the information on the restricted cells in which the mobility of the M2M/MTC device is predicted.

In the measurement method of the M2M/MTC device according to the second embodiment of the present invention, the M2M/MTC device skips intra-frequency/inter-frequency/inter-RAT measurement out of the data communication-permitted period/time (transmission and/or reception allowed period/time) and performs intra-frequency/inter-frequency/inter-RAT measurement in the data communication-permitted period/time when data communication-permitted period/time arrives.

Figure 3A:
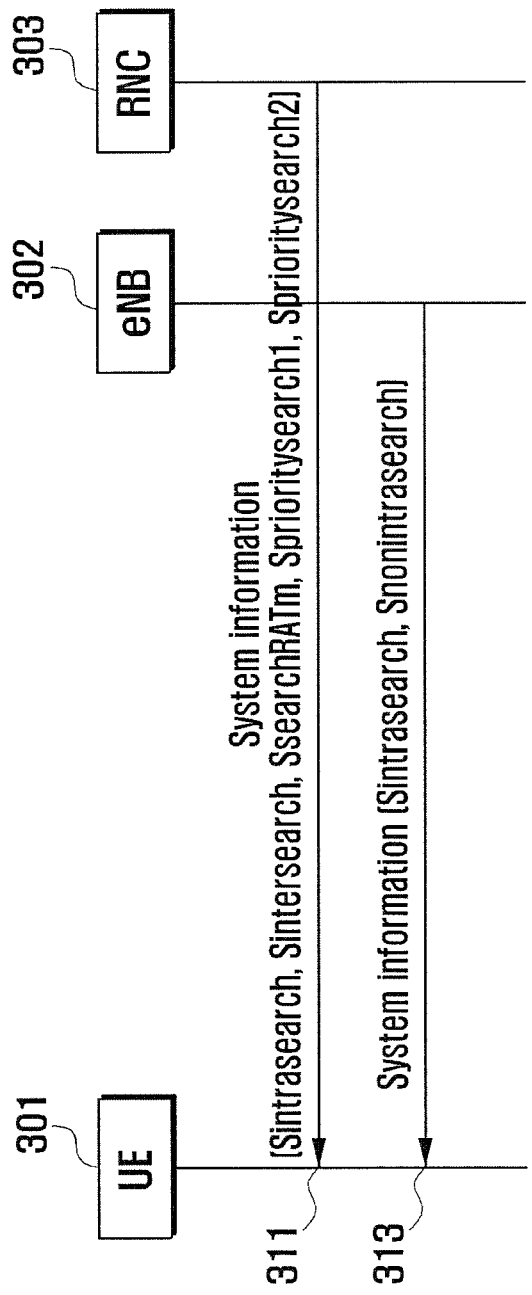
FIGS. 3a to 3c are diagrams illustrating the idle mode UE management method in the 3GPP UMTS/LTE mobile communication system.
Figure 3B:
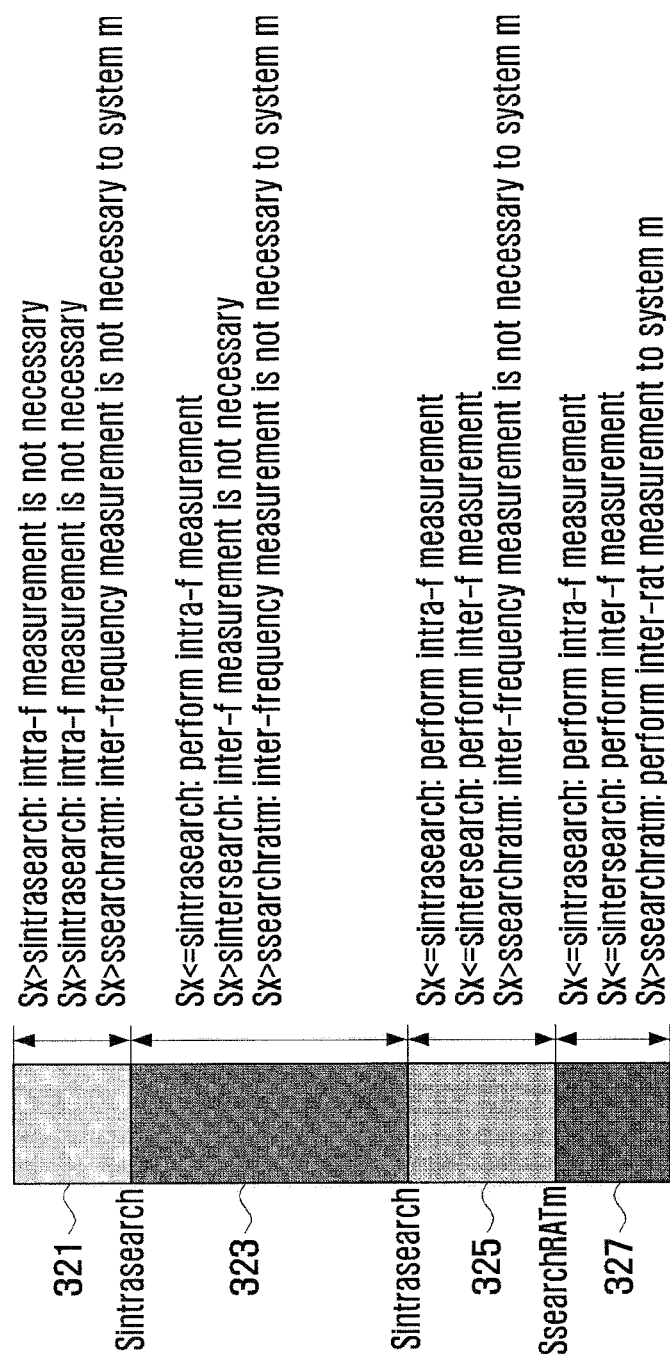
Figure 3C:
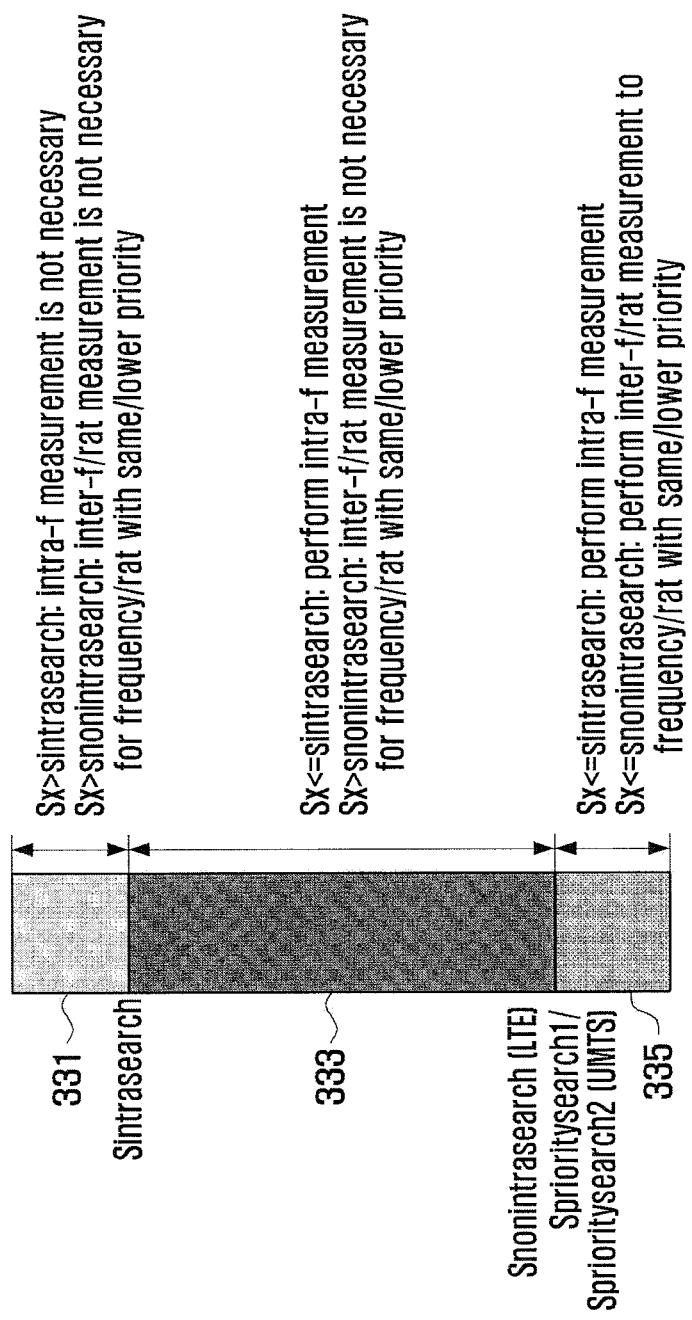

The intra-frequency/inter-frequency/inter-RAT measurement is performed while the M2M/MTC device is in idle mode until the data communication-permitted period/time ends. The intra-frequency/inter-frequency/inter-RAT measurement can be performed according to the measurement method of FIGS. 3a to 3c and/or the first embodiment of the present invention or periodically in simple manner. If data occurs out of the range of the data communication-permitted period/time, the M2M/MTC device is capable of performing idle mode intra-frequency/inter-frequency/inter-RAT measurement from the transmission data occurrence timing. The intra-frequency/inter-frequency/inter-RAT measurement is performed continuously before the M2M/MTC device switches from the idle mode to the Radio Resource Control (RRC) connected mode. The intra-frequency/inter-frequency/inter-RAT measurement can be implemented according to the method of FIGS. 3a to 3c or the first embodiment of the present invention or periodically in simple manner. The above embodiment can be applied to all M2M/MTC devices without limitation to the low mobility M2M/MTC devices.

According to the above two embodiments of the present invention, the number of cells to perform the measurement is restricted or the measurement is not performed under a specific condition such that it is possible to reduce the active time for measurement of the M2M/MTC device, thereby reducing power consumption of the M2M/MTC device.

Figure 4A:
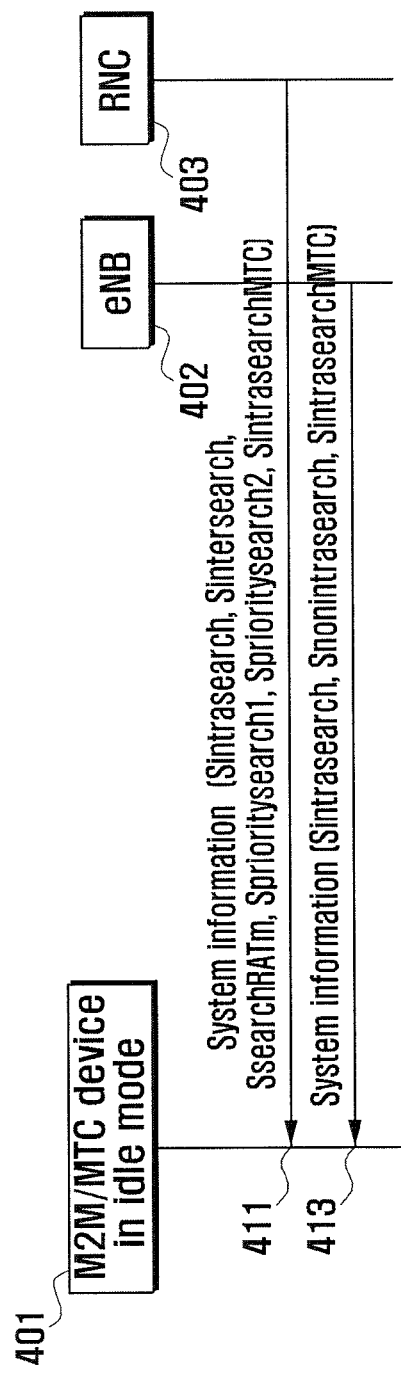
FIGS. 4a to 4c are diagrams illustrating a measurement method of the M2M/MTC device with low mobility in the mobile communication system proposed in the present invention.
Figure 4B:
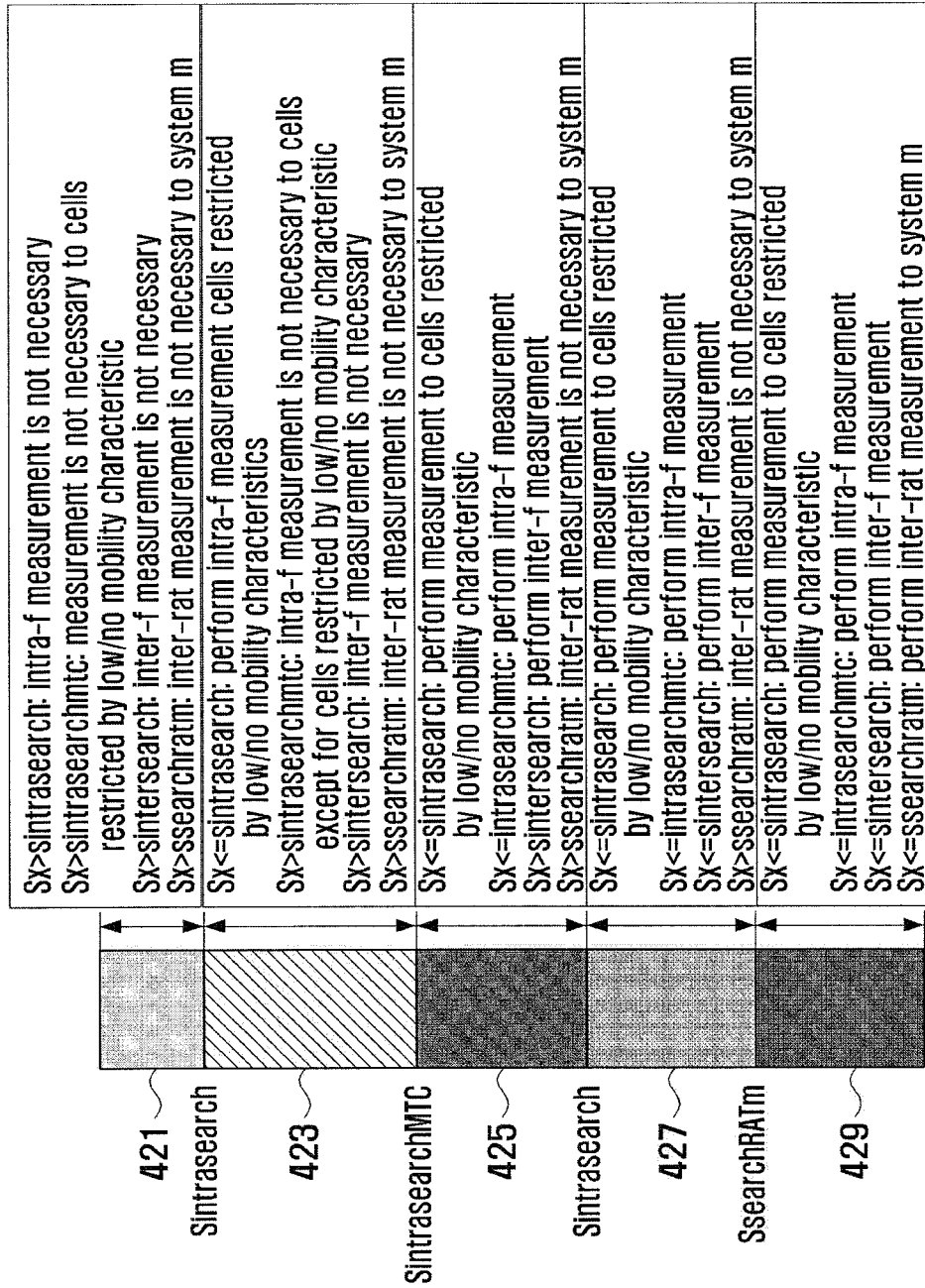
Figure 4C:
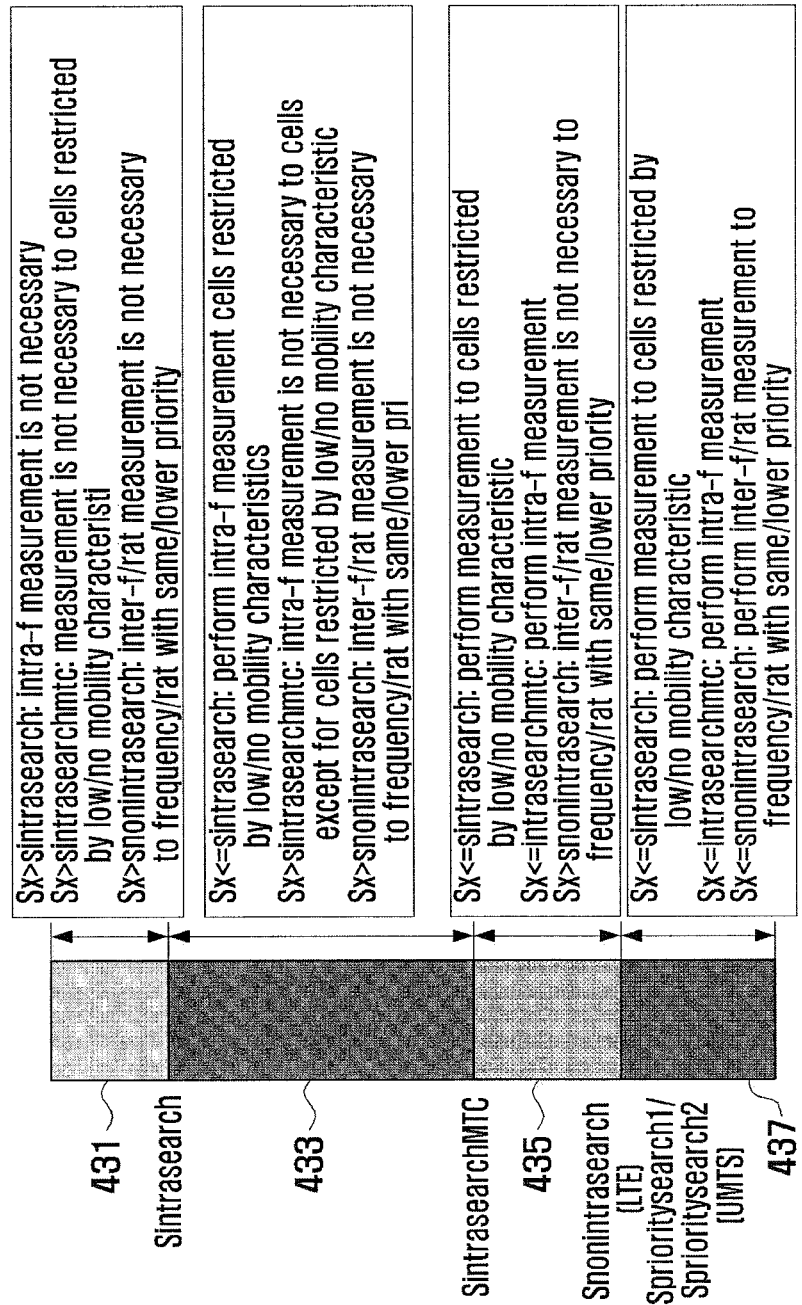

FIGS. 4a to 4c are diagrams illustrating a measurement method of the M2M/MTC device with low mobility in the mobile communication system proposed in the present invention. According to an embodiment of the present invention, the RSCP measurement or Ec/No measurement value (UMTS system) or RSRP measurement and RSRQ measurement value (LTE system) of the serving cell is referred to as Sx for simplicity purpose.

Referring to FIGS. 4a to 4c, reference number 401 of FIG. 4a denotes an idle mode M2M/MTC device with low mobility, reference number 402 denotes an eNB of the LTE mobile communication system, and reference number 403 denotes an RNC of the UMTS mobile communication system. Here, the RNC 403 transmits to the M2M/MTC device 401 the system information including Sintrasearch, Sintersearch, SsearchRATm, Sprioritysearch1, Spriority-search2, and SintrasearchMTC; the eNB 302 transmits to the M2M/MTC device 401 the system information including Sintrasearch, Sintersearch, and SintrasearchMTC. According to an embodiment of the present invention, the eNB/RNC configures SintrasearchMTC information into the system information along with other information described with reference to FIGS. 3a to 3c and broadcasts the system information within the cell.

The SintrasearchMTC is the value to be compared with the Sx of the serving cell, and thus the M2M/MTC device 401 with low mobility compares Sx of the serving cell with SintrasearchMTC and, if Sx is (equal to or) greater than SintrasearchMTC, suspends intra-frequency measurement for the cells with the exception of a limited number of cells where the mobility of the M2M/MTC device is predicted, and, otherwise if Sx is (equal to or) less than SintrasearchMTC, performs conventional intra-frequency measurement. If the Sx is (equal to or) less than Sintrasearch as the reference threshold value for intra-frequency measurement, the M2M/MTC device 401 performs intra-frequency measurement to a limited number of cells where mobility of the M2M/MTC device is predicted.

Here, the above described measurement procedure can be applied to the inter-frequency measurement method. In which case, the measurement comparison threshold value (e.g. SintersearchMTC) for inter-frequency measurement of the M2M/MTC device can be transmitted in addition to the Sintersearch as the measurement comparison value for inter-frequency measurement. The inter-frequency measurement method is identical with the intra-frequency measurement method with the exception that the inter-frequency measurement, rather than the intra-frequency measurement, is performed with the conventional reference measurement comparison threshold value for the inter-frequency measurement and the additional measurement comparison threshold value. Such a measurement method can be applied to the inter-RAT measurement method. In this case, an additional measurement comparison threshold value (e.g. SsearchRATmMTC) for inter-RAT measurement of the M2M/MTC device can be transmitted in addition to SsearchRATm as the measurement comparison threshold value for inter-RAT measurement. The inter-RAT measurement method can be performed in the same manner as the intra-frequency measurement method with the exception that the inter-RAT measurement, rather than intra-measurement, is performed according to the conventional measurement comparison threshold value for inter-RAT measurement and the additional measurement threshold value for M2M/MTC device.

In the present invention, the description is made under the assumption of using SintrasearchMTC.

According to another embodiment of the present invention, if Sx is (equal to or) less than SintrasearchMTC, it is possible to perform the inter-frequency measurement and/or inter-RAT measurement as well as the intra-frequency measurement to the limited number of cells where the mobility of the M2M/MTC device is predicted.

Here, Sintrasearch, Sintersearch, SsearchRATm, Sprioritysearch1, and Sprioritysearch2 can be the information related to the normal measurement, and SintersearchMTC, SintrasearchMTC, SsearchRATmMTC can be the measurement information of the M2M/MTC device with low mobility.

Although not depicted in FIGS. 4a to 4c, each system information can be broadcast in the form of different information or value depending on the measurement type of the serving cell which is expressed as Sx of the serving cell. For example, if the received signal power or the received signal quality of the reference channel of the serving cell is used as Sx, the eNB is capable of signaling the SintrasearchMTC1 and SintrasearchMTC2 as the separately applied comparison threshold values.

In the UMTS mobile communication system to which inter-frequency/inter-RAT priory is not applied, the M2M/MTC device having low mobility compares the measurement value on the radio channel of the current serving cell Sx with SintrasearchMTC. The measurement value Sx for the serving cell can be the received signal power of the reference channel of the serving cell or the received signal quality of the reference channel of the serving cell to the entire interference. Here, the received signal power on the reference channel of the serving cell can be CPICH RSCP of the UMTS mobile communication system or RSRP of the LTE mobile communication system, and the received signal quality on the reference channel of the serving cell to the entire interference can be CPICH Ec/No of the UMTS mobile communication system or RSRQ of the LTE mobile communication system. The measurement procedure is specified in the 3GPP standard TS25.215/TS36.214.

As denoted by reference number 421 of FIG. 4b, if Sx of the serving cell is (equal to or) greater than Sintrasearch, the M2M/MTC device performs measurement for the current serving cell but not any intra-frequency measurement. As denoted by reference numbers 423, 425, 427, and 429, if Sx of the serving cell is (equal to or) less than Sintrasearch, the M2M/MTC device performs intra-frequency measurement to the limited number of cells where the mobility of the M2M/MTC device is predicted. As denoted by reference numbers 421 and 423, if Sx of the serving cell is (equal to or) greater than SintrasearchMTC, the M2M/MTC device suspends performing intra-frequency measurement for other cell with the exception of the limited number of cells where the mobility of the M2M/MTC device is predicted. As denoted by reference numbers 425, 427, and 429, if Sx of the serving cell is (equal to or) less than SintrasearchMTC, the M2M/MTC device performs the normal intra-frequency measurement regardless of the limited number of cells where the mobility of the M2M/MTC device is predicted. As denoted by reference number 423, the M2M/MTC device is capable of determining the conditions in which Sx of the current serving cell is (equal to or) less than Sintrasearch and (equal to or) greater than SintrasearchMTC as the condition for performing the intra-frequency measurement to the limited number of cells where the mobility of the me2m/MTC device is predicted.

According to another embodiment of the present invention, an additional comparison threshold value (e.g. SintersearchMTC) for triggering inter-frequency/inter-RAT measurement of the M2M/MTC device with low mobility is signaled in the form of system information and, if the Sx is (equal to or) less than Sintersearch, the M2M/MTC device performs inter-frequency measurement to the limited number of cells where the mobility of the M2M/MTC device is predicted. If Sx of the current serving cell is (equal to or) greater than SintersearchMTC, the M2M/MTC device does not perform inter-frequency measurement for other cells with the exception of eh limited number of cells where the mobility of the M2M/MTC device is predicted. Otherwise, if Sx of the current cell is (equal to or) less than SintersearchMTC, the M2M/MTC device performs inter-frequency measurement regardless of the limited number of cell where the mobility of the M2M/MTC device is predicted. If the Sx of the current serving cell is (equal to or) less than SsearchRATm, the M2M/MTC device performs inter-RAT measurement to the system m for the limited number of cells where the mobility of the M2M/MTC device is predicted. If the Sx of the current serving cell is (equal to or) greater than SsearchRATmMTC, the M2M/MTC device does not perform interORAT measurement to the system m for other cells with the exception of the limited number of cells where the mobility of the M2M/MTC device is predicted. Otherwise, if Sx of the current serving cell is (equal to or) less than SsearchRATmMTC value, the M2M/MTC device performs inter-RAT measurement to the legacy system m regardless of the limited number of cells where the mobility of the M2M/MTC device is predicted. The condition required for the M2M/MTC device to perform the inter-frequency measurement to the limited number of cells where the mobility of the M2M/MTC device is predicted can be configured as the condition where the Sx of the current cell is (equal to or) less than Sintersearch and (equal to or) greater than SintersearchMTC, and the conditions required for the M2M/MTC device to perform the inter-RAT measurement to the limited number of cells where the mobility of the M2M/MTC device is predicted can be configured as the condition where Sx of the current serving cell is (equal to or) less than SsearchRATm and (equal to or) greater than SsearchRATmMTC.

According to another embodiment of the present invention, if Sx of the current serving cell is (equal to or) less than SintrasearchMTC, the M2M/MTC device performs inter-frequency measurement or Inter-RAT measurement as well as intra-frequency measurement to the limited number of cells where the mobility of the M2M/MTC device is predicted.

If Sx of the current serving cell is (equal to or) less than Sintrasearch, the M2M/MTC device performs intra-frequency/inter-frequency/inter-RAT measurement for the current serving cell and the limited number of cells where the mobility of M2M/MTC device is predicted. If Sx of the current serving cell is (equal to or) greater than SintrasearchMTC, the M2M/MTC device does not perform intra-frequency/inter-frequency/inter-RAT measurement to the limited number of cells where the mobility of the M2M/MTC device is predicted and, otherwise if Sx of the current serving cell is (equal to or) less than SintrasearchMTC, the M2M/MTC device performs the conventional intra-frequency regardless of the limited number of cells where the mobility of the M2M/MTC device is predicted and performs inter-frequency and inter-RAT measurements with Sintersearch and SsearchRATm as the conventional comparison threshold values.

In the UMTS mobile communication system and LTE mobile communication system to which inter-frequency/inter-RAT priority is applied, the M2M/MTC device with low mobility compares, upon receipt of the system information, the measurement value Sx of the radio channel of the current serving cell with SintrasearchMTC at steps 411 and/or 413. The received signal power on the reference channel of the serving cell or the received signal quality on the reference channel of the serving cell to the entire interference can be uses as the measurement value Sx of the serving cell. Here, the received signal power on the reference channel of the serving cell can be CPICH RSCP of the UMTS mobile communication system or RSRP of the LTE mobile communication system, and the received signal quality on the reference channel of the serving cell to the entire interference can be CPICH Ec/No of the UMTS mobile communication system or RSRQ of the LTE mobile communication system. The measurement process is specified in the 3GPP standard TS25.215/TS36.214.

As denoted by reference number 431 of FIG. 4c, if Sx of the current serving cell is (equal to or) greater than Sintrasearch, the M2M/MTC device performs measurement for the current serving cell but not any intra-frequency measurement. As denoted by reference numbers 433, 3=435, and 437 of FIG. 4c, if Sx of the current serving cell is (equal to or) less than Sintrasearch, the M2M/MTC device performs intra-frequency measurement to the limited number of cells where the mobility of the M2M/MTC device is predicted. As denoted by reference number 431 and 433, if Sx of the current serving cell is (equal to or) greater than SintrasearchMTC, the M2M/MTC device does not perform intra-frequency measurement for other cells with the exception of the limited number of cells wherein the mobility of the M2M/MTC device is predicted and, otherwise if Sx, as denoted by reference number 435 and 437, is (equal to or) less than SintrasearchMTC, performs the conventional intra-frequency measurement regardless of the limited number of cells where the mobility of the M2M/MTC device. As denoted by reference number 433, the condition required for performing intra-frequency measurement to the limited number of cells wherein the mobility of the M2M/MTC device can be configured as the condition where Sx of the current serving cell is (equal to or) less than Sintrasearch and (equal to or) greater than SintrasearchMTC.

According to another embodiment of the present invention, an additional comparison threshold value for triggering inter-frequency/inter-RAT measurement of the M2M/MTC device with low mobility (e.g. SnonintrasearchMTC (LTE) or Spriorityseach1MTC/Spriorityseach2MTC (UMTS) is signaled as system information and if Sx of the current serving cell is (equal to or) less than Snonintrasearch (LTE) or Spriorityseach1/Spriorityseach2, the M2M/MTC device performs inter-frequency/inter-RAT measurement on the frequency/RAT having a priority less than that of the frequency of the current serving cells for the limited number of cell where the mobility of the M2M/MTC device is predicted. If Sx of the current serving cell is (equal to or) greater than SnonintersearchMTC (LTE) or Spriorityseach1MTC/Spriorityseach2MTC (UMTS), the M2M/MTC device does not perform inter-frequency/inter-RAT measurement on the frequency/RAT having the priority less than that of the current serving cell for the cells with the exception of the limited number of cells where the mobility of the M2M/MTC device is predicted and, if Sx of the current serving cell is (equal to or) less than SnonintersearchMTC (LTE) or Spriorityseach1MTC/Spriorityseach2MTC (UMTS), performs inter-frequency/inter-RAT measurement on the frequency/RAT having the priority (equal to or) less than that of the frequency of the current serving cell regardless of the limited number of cells where the mobility of the M2M/MTC device is predicted.

According to another embodiment of the present invention, if it is possible to perform the inter-frequency measurement or inter-RAT measurement as well as the intra-frequency measurement to the limited number of cells where the mobility of the M2M/MTC device when Sx of the serving cell is (equal to or) less than SintrasearchMTC, the M2M/MTC device is performs, when Sx of the current serving cell is (equal to or) less than Sintrasearch, intra-frequency measurement to the limited number of cells where the mobility of the M2M/MTC device is predicted and inter-frequency and/or inter-RAT measurement on the frequency/RAT having the priority lower than that of the frequency of the current serving cell. If Sx of the current serving cell is (equal to or) greater than SintrasearchMTC, the M2M/MTC does not perform intra-frequency for the cells with the exception of the limited number of cells where the mobility of the M2M/MTC device is predicted and inter-frequency and inter-RAT measurements for the frequency/RAT having the priority lower than that of the frequency of the current serving cells and, otherwise if Sx of the current serving cell is (equal to or) less than SintrasearchMTC, performs conventional intra-frequency measurement regardless of the limited number of cells where the mobility of the M2M/MTC device and inter-frequency and inter-RAT measurements for the frequency/RAT having the priority lower than that of the frequency of the current serving cell with Snonintrasearch (LTE) or Spriorityseach1/Spriorityseach2 as the conventional comparison threshold value.

The idle mode M2M/MTC device with low mobility is capable of being aware that it is the M2M/MTC device with low mobility and acquires the information on the limited number of cells where the mobility of the M2M/MTC device is predicted from the measurement result on the radio channel of the M2M/MTC device or receives it from the higher layer entity of the M2M/MTC device or from a network node in OMA DM (Device Management) or NAS (Non-Access Stratum) control message or recognizes implicitly by configuring a registration area of the M2M/MTC device (e.g. Routing Area (RA) of UMTS mobile communication system or Tracking Area (TA) of LTE mobile communication system) and mapping the registration area to the cells. In case of configuring the registration area of the idle mode M2M/MTC device and mapping the registration area to the cell implicitly, the M2M/MTC device receives the information on the cells constituting the registration area of the idle mode M2M/MTC device from the network node (e.g. MME or Server). The present invention does not rule out the other methods in which the idle mode M2M/MTC device with low mobility recognizes itself as the M2M/MTC device with low mobility and acquires the information on the limited number of cells where the mobility of the M2M/MTC device is predicted.

Figure 5:
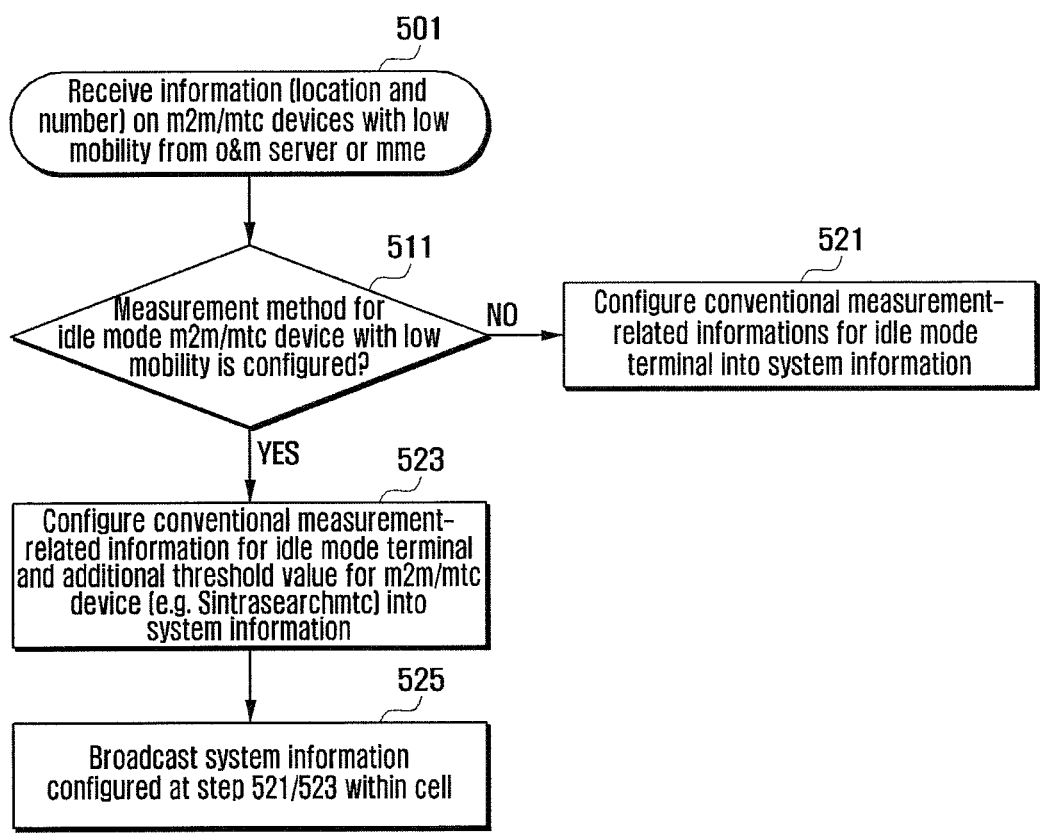
FIG. 5 is a flowchart illustrating a network operation according to the embodiment of FIGS. 4a to 4c.

FIG. 5 is a flowchart illustrating a network operation according to the embodiment of FIGS. 4a to 4c. FIG. 5 is a flowchart illustrating procedure of the RNC of the 3GPP UMTS mobile communication system and the eNB of the LTE mobile communication system.

Referring to FIG. 5, the eNB/RNC receives the information about the M2M/MTC devices with low mobility from an O&M server or MME at step 501. The information is capable of including the locations and number of the M2M devices. The location information is capable of including cell information and paging registration area information, and the number information is capable of including the number of M2M/MTC devices. The eNB/RNC determines whether to configure an additional measurement method for the idle mode M2M/MTC devices with low mobility based on the received information at step 511. At step 511, if there is no information on the number of M2M/MTC devices or the number of is small enough to negligible and thus there is no need to optimize the idle mode management method for the M2M/MTC devices, the eNB/RNC configures the conventional measurement-related informations for the idle mode UE into the system information at step 521. Otherwise, if the number of the idle mode M2M/MTC devices with low mobility is large and thus it is necessary to optimize the idle mode management method for the M2M/MTC devices, the eNB/RNC configures the system information with additional comparison threshold informations (e.g. SintrasearchMTC) for the M2M/MTC device as well as the information related to the conventional measurement for the idle mode UE at step 523. Next, the eNB/RNC broadcasts the system information configured at step 525.

Although not depicted in FIG. 5, the O&M server or MME is capable of transmitting the information on whether the idle mode measurement method optimization for the idle mode M2M/MTC devices with low mobility is necessary rather than the information on the M2M/MTC devices with low mobility.

Figure 6:
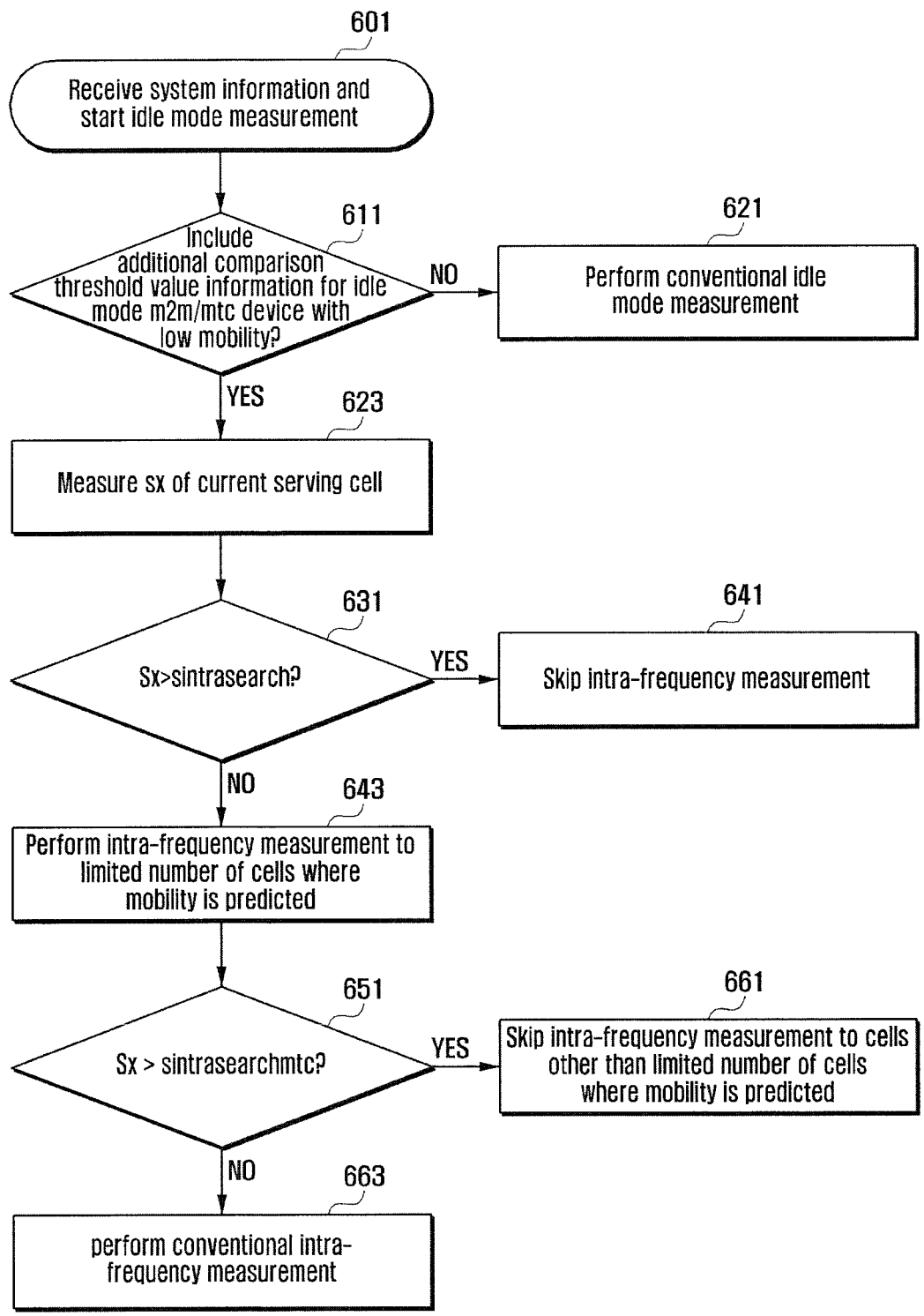
FIG. 6 is a flowchart illustrating the procedure of the idle mode M2M/MTC device with low mobility according to the embodiment of FIGS. 4a to 4c.

FIG. 6 is a flowchart illustrating the procedure of the idle mode M2M/MTC device with low mobility according to the embodiment of FIGS. 4a to 4c.

Referring to FIG. 6, the idle mode M2M/MTC device with low mobility receives the system information and starts idle mode measurement at step 601. The M2M/MTC device determines whether the received system information includes the information related to the idle mode measurement optimization for the idle mode M2M/MTC device with low mobility at step 611. It is assumed that the information related to the idle mode measurement of the idle mode M2M/MTC device with low mobility is the additional comparison threshold value SintrasearchMTC for use in the idle mode measurement of the idle mode M2M/MTC device with low mobility. Here, the comparison threshold value SintrasearchMTC can be the additional measurement information. If the system information includes no information related to the idle mode measurement for the idle mode M2M/MTC device with low mobility at step 611, the M2M/MTC device performs the measurement method for the conventional idle mode UE at step 621. However, if the system information includes the information related to the idle mode measurement for the idle mode M2M/MTC device with low mobility, the M2M/MTC device measures Sx of the current serving cell at step 623. Here, the measurement value for the serving cell Sx can be the received signal power of the reference channel of the serving cell or the received signal quality of the reference channel of the serving cell to the measured entire interference. The received signal power of the reference channel of the serving cell can be CPICH RSCP of the UMTS mobile communication system or RSRP of the LTE mobile communication system, and the received quality of the reference channel of the serving cell to the entire interference can be CPICH Ec/No of the UMTS mobile communication system or RSRQ of the LTE mobile communication system. The measurement procedure is specified in the 3GPP standard TS25.215/TS36.214.

Afterward, the M2M/MTC device compares the measurement value on the radio of the current serving cell Sx with Sintrasearch at step 631. If the Sx of the current serving cell is (equal to or) greater than Sintrasearch at step 631, the M2M/MTC device performs measurement for the current serving cell but not intra-frequency measurement at step 641. Otherwise, if the Sx of the current serving cell is (equal to or) less than Sintrasearch, the M2M/MTC device performs intra-frequency measurement to a limited number of cells where the mobility of the M2M/MTC device is predicted at step 643. Next, the M2M/MTC device compares the value Sx measured on the radio of the current serving cell with SintrasearchMTC at step 651. If Sx of the current serving cell is (equal to or) greater than SintrasearchMTC at step 651, the M2M/MTC device does not perform intra-frequency measurement for other cells with the exception of the limited number of cells where the mobility of the M2M/MTC device is predicted at step 661. Otherwise, if Sx of the current serving cell is (equal to or) less than SintrasearchMTC at step 651, the M2M/MTC device performs conventional intra-frequency measurement regardless of the limited number of cells where the mobility of the M2M/MTC device is predicted at step 663.

According to another embodiment, the condition for performing the intra-frequency measurement to the limited number of cells where the mobility of the M2M/MTC device is predicted can be restricted to the condition of Sx (equal to or) less than Sintrasearch and (equal to or) greater than SintrasearchMTC.

Although not depicted in FIG. 6, according to another embodiment of the present invention, an additional comparison threshold value (e.g. SintersearchMTC) for triggering inter-frequency/inter-RAT measurement of the M2M/MTC device with low mobility or an additional comparison threshold value (e.g. SsearchRATmMTC) for triggering inter-RAT measurement can be signaled as system information. At this time, if the additional comparison threshold value (e.g. SintersearchMTC) for triggering inter-frequency/inter-RAT measurement, the following operation can be performed. If Sx of the current serving cell is (equal to or) less than Sintersearch, the M2M/MTC device performs inter-frequency measurement to the limited number of cells where the mobility of the M2M/MTC device is predicted. If Sx is (equal to or) greater than SintersearchMTC, the M2M/MTC device does not perform inter-frequency measurement for other cell with the exception of the limited number of cells where the mobility of the M2M/MTC device is predicted and, otherwise if Sx of the current serving cell is (equal to or) less than SintersearchMTC, performs the conventional inter-frequency measurement regardless of the limited number of cells where the mobility of the M2M/MTC device is predicted. If the additional comparison threshold value (e.g. SsearchRATmMTC) for triggering inter-RAT measurement, the following operations can be performed. If Sx of the current serving cell is (equal to or) less than SsearchRATm, the M2M/MTC device performs inter-RAT measurement to the system m for the limited number of cells where the mobility of the M2M/MTC device is predicted. If Sx of the current serving cell is (equal to or) greater than SsearchRATmMTC, the M2M/MTC device does not perform inter-RAT measurement to the system m for the other cells with the exception of the limited number of cells wherein the mobility of the M2M/MTC device is predicted and, otherwise if Sx of the current serving cell is (equal to or) less than SsearchRATmMTC, performs inter-RAT measurement to the conventional system m regardless of the limited number of cells where the mobility of the M2M/MTC device is predicted. According to another embodiment, the condition required for performing inter-frequency measurement to the limited number of cells where the mobility of the M2M/MTC device is predicted can be restricted to the condition requiring that Sx of the current serving cells is (equal to or) less than Sintersearch and (equal to or) greater than SintersearchMTC, and the condition required for performing inter-RAT measurement to the limited number of cell where the mobility of the M2M/MTC device is predicted can be restricted to the condition requiring that Sx of the serving cell is (equal to or) less than SsearchRATm and (equal to or) greater than SsearchRATmMTC.

Although not depicted in FIG. 6, according to another embodiment, if the inter-frequency measurement or inter-RAT measurement can be performed as well as the intra-frequency measurement to the limited number of cells wherein the mobility of the M2M/MTC device is predicted when Sx of the serving cell is (equal to or) less than SintrasearchMTC, the M2M/MTC device performs, if Sx of the current serving cell is (equal to or) less than Sintrasearch, intra-frequency, inter-frequency, inter-RAT measurements for the current serving cell and the limited number of cells where the mobility of the M2M/MTC device. If Sx of the current serving cell is (equal to or) greater than SintrasearchMTC, the M2M/MTC device does not perform intra-frequency, inter-frequency, inter-RAT measurements for the other cells with the exception of the limited number of the cells where the mobility of the M2M/MTC device is predicted and, otherwise if Sx of the current serving cell is (equal to or) less than SintrasearchMTC, performs conventional intra-frequency measurement regardless of the limited number of the cells where the mobility of the M2M/MTC device is predicted and performs the inter-frequency measurement and inter-RAT measurement with the conventional threshold values of Sintersearch and SsearchRATm.

The operations of the M2M/MTC device with Sintrasearch and SintrasearchMTC in the UMTS mobile communication system and LTE mobile communication system using inter-frequency/inter-RAT priority are identical with the measurement method in the UMTS mobile communication system to which the aforementioned inter-frequency/inter-RAT priority is not applied. However, in case that the additional comparison threshold value (e.g. SnonintrasearchMTC (LTE) or Spriorityseach1MTC/Spriorityseach2MTC (UMTS)) for triggering inter-frequency/inter-RAT measurement of the M2M/MTC device with low mobility is signaled as the system information in the UMTS mobile communication system and LTE mobile communication system to which inter-frequency/inter-RAT priority is applied, if Sx of the current serving cell is (equal to or) less than Snonintrasearch (LTE) or Spriorityseach1/Spriorityseach2, the M2M/MTC device performs inter-frequency/inter-RAT measurement to the frequency/RAT having the priority lower than that of the frequency of the current serving cell for the limited number of cells where the mobility of the M2M/MTC device is predicted. If Sx of the current serving cell is (equal to or) greater than SnonintersearchMTC (LTE) or Spriorityseach1MTC/Spriorityseach2MTC (UMTS), the M2M/MTC device does not perform inter-frequency/inter-RAT measurement to the frequency/system having the priority less than that of the frequency of the current serving cell for the other cells with the exception of the limited number of cells where the mobility of the M2M/MTC device is predicted and, otherwise if Sx of the current serving cell is (equal to or) less than SnonintersearchMTC (LTE) or Spriorityseach1MTC/Spriorityseach2MTC (UMTS), performs inter-frequency/inter-RAT measurement to the frequency/RAT having the priority of (equal to or) less than that of the frequency of the current serving cell regardless of the limited number of cells where the mobility of the M2M/MTC device is predicted.

According to another embodiment of the present invention, if the inter-frequency measurement or inter-RAT management can be performed as well as the intra-frequency measurement to the limited number of cells where the mobility of the M2M/MTC device is predicted when Sx of the serving cell is (equal to or) less than SintrasearchMTC, the M2M/MTC device performs, if Sx of the current serving cell is (equal to or) less than Sintrasearch, intra-frequency measurement to the limited number of cells where the mobility of the M2M/MTC device is predicted and inter-frequency and/or inter-RAT measurement to the frequency/RAT having the priority lower than that the frequency of the current serving cell. If Sx of the current serving cell is (equal to or) greater than SintrasearchMTC, the M2M/MTC device performs intra-frequency measurement for the other cells with the exception of the limited number of cells where the mobility of the M2M/MTC device is predicted and suspends the inter-frequency and inter-RAT measurement to the frequency/RAT having the priority lower than that of the frequency of the current serving cell and, otherwise if Sx of the current serving cell is (equal to or) less than SintrasearchMTC, performs the conventional intra-frequency measurement regardless of the limited number of cells where the mobility of the M2M/MTC device is predicted and inter-frequency and inter-RAT measurements to the frequency/RAT having the priority lower than that of the frequency of the current serving cell with the conventional comparison threshold value of Snonintrasearch (LTE) or Spriorityseach1/Spriorityseach2.

The idle mode M2M/MTC device with low mobility is capable of being aware that it is the M2M/MTC device with low mobility and acquires the information on the limited number of cells where the mobility of the M2M/MTC device is predicted from the measurement result on the radio channel of the M2M/MTC device or receives it from the higher layer entity of the M2M/MTC device or from a network node in OMA DM (Device Management) or NAS (Non-Access Stratum) control message or recognizes implicitly by configuring a registration area of the M2M/MTC device (e.g. Routing Area (RA) of UMTS mobile communication system or Tracking Area (TA) of LTE mobile communication system) and mapping the registration area to the cells. In case of configuring the registration area of the idle mode M2M/MTC device and mapping the registration area to the cell implicitly, the M2M/MTC device receives the information on the cells constituting the registration area of the idle mode M2M/MTC device from the network node (e.g. MME or Server). The present invention does not rule out the other methods in which the idle mode M2M/MTC device with low mobility recognizes itself as the M2M/MTC device with low mobility and acquires the information on the limited number of cells where the mobility of the M2M/MTC device is predicted.

FIG. 7 shows another embodiment of the measurement method of idle mode M2M/MTC device in the mobile communication system proposed in the second embodiment of the present invention. The invention of FIG. 7 is not limited to the M2M/MTC device with low mobility but application to all the types of M2M/MTC devices. The M2M/MTC device performs data transmission/reception only for predetermined period/time. For example, the data transmission/reception of a metering/meter-reading system can be restricted, by the operator, to be performed for specific time duration with low data traffic of communication terminal such as normal mobile phones by the operator. This is to minimize influence of the data transmission/reception of the metering/meter-reading system to the communication of the terminals such as conventional mobile phone. Meanwhile, the data reception of the M2M/MTC device can be received for specific period/time. For example, if emergency data of the metering/meter-reading system (e.g. the data alarming the electrical overload state which may cause fire or alarming the flood caused by water leakage) occurs, it should be allowed to transmit emergency data immediately. The invention of FIG. 7 can be applied to the case where the data transmission/reception of the M2M/MTC device is performed for predetermined period/time or only the data reception of the M2M/MTC device is performed for predetermined period/time.

The M2M/MTC device 701 can be the M2M/MTC device in idle mode. The idle mode M2M/MTC device 701 does not perform intra-frequency/inter-frequency/inter-RAT measurement for the period/time for from the data communication-allowed period/time or data reception-allowed period/time as denoted by reference number 711. That is, the M2M/MTC device does not performs intra-F/inter-F/inter-RAT measurement for the period/time other than period/time in a specific threshold time value before the start of the data transmission/reception-allowed (period/time for receiving information from the higher layer) and the period/time other than the period/time in a specific threshold time value (period/time other than first and second period/time). Also, the periodic paging message reception check is not necessary in the corresponding period/time. That is, it is not necessary to perform intra-F/inter-F/inter-RAT measurement outside the data transmission/reception-allowed period/time (period/time for receiving information from higher layer). If it is the time before the start of data (transmission) reception-allowed period/time of the M2M/MTC device as much as predetermined threshold time value (here, the predetermined threshold time value may be 0) as denoted by reference number 731, the M2M/MTC device starts intra-frequency/inter-frequency/inter-RAT measurement based on the system information received from the cell. At this time, the predetermined threshold value can be a specific threshold time value, and the specific threshold value can be a fixed value determined as standard or the system information configured by the system that is broadcast within the cell or signaled through the control message dedicated to the M2M/MTC device. At this time, the RNC 703 transmits to the M2M/MTC device the system information including Sintrasearch, Sintersearch, SsearchRATm, Sprioritysearch1, Sprioritysearch2, and SintrasearchMTC at step 721; and the eNB 702 transmits to the M2M/MTC device the system information including Sintrasearch, Sintersearch, and SintrasearchMTC at step 723. As denoted by reference number 731 at the M2M/MTC device side, the intra-frequency/inter-frequency/inter-RAT measurement is performed continuously while the M2M/MTC device is in idle mode until the data (transmission) reception-allowed period/time ends. The period for performing the intra-frequency/inter-frequency/inter-RAT measurement is identical with the data (transmission) reception-allowed period/time of the M2M/MTC device (when the measurement starts in the (transmission) reception-allowed period/time) or a little longer than the data (transmission) reception period/time of the M2M/MTC device (when the measurement starts before the start of the data (transmission) reception-allowed period/time) as much as specific threshold value). if the M2M/MTC device is actually (transmitting) receiving data, the M2M/MTC device transitions from the idle mode to RRC connected mode for data (transmission) reception as denoted by reference number 733 and it is not necessary for the M2M/MTC device to perform idle mode measurement in the RRC connected mode. The intra-frequency/inter-frequency/inter-RAT measurement of the idle mode M2M/MTC device is performed according to the conventional measurement method of FIGS. 3a to 3c and the embodiment of FIGS. 4a to 4c of the present invention in the period/time denoted by reference number 731 or the periodic intra-frequency/inter-frequency/inter-RAT measurement can be performed simply. If the data (transmission) reception-allowed period/time of the M2M/MTC device ends, the M2M/MTC device does not perform intra-frequency/inter-frequency/inter-RAT measurement as denoted by reference number 741 and also the periodic paging message reception check is not necessary.

If data to be transmitted by the M2M/MTC device occurs in the period/time outside the allowed data (transmission) reception period/time of the M2M/MTC device as denoted by reference number 751, the M2M/MTC device receives the system information from the cell at the time when the data to be transmitted occurs as denoted by reference numbers 761 and 763 and performs idle mode intra-frequency/inter-frequency/inter-RAT measurement based on the received system information as denoted by reference number 771. As denoted by reference number 771, the idle mode intra-frequency/inter-frequency/inter-RAT measurement is performed continuously before the M2M/MTC device transitions from the idle mode to the RRC connected mode as denoted by reference number 781. The intra-frequency/inter-frequency/inter-RAT measurement of the idle mode M2M/MTC device can be performed with the conventional measurement method of FIGS. 3a to 3c or the method according to the embodiment of the present invention that is proposed in FIGS. 4a to 4c, or the periodic intra-frequency/inter-frequency/inter-RAT measurement can be performed simply. Once the data transmission of the M2M/MTC device ends, the M2M/MTC device does not perform intra-frequency/inter-frequency/inter-RAT measurement as denoted by reference number 791 and is not necessary to perform periodic paging message reception check.

Figure 8A:
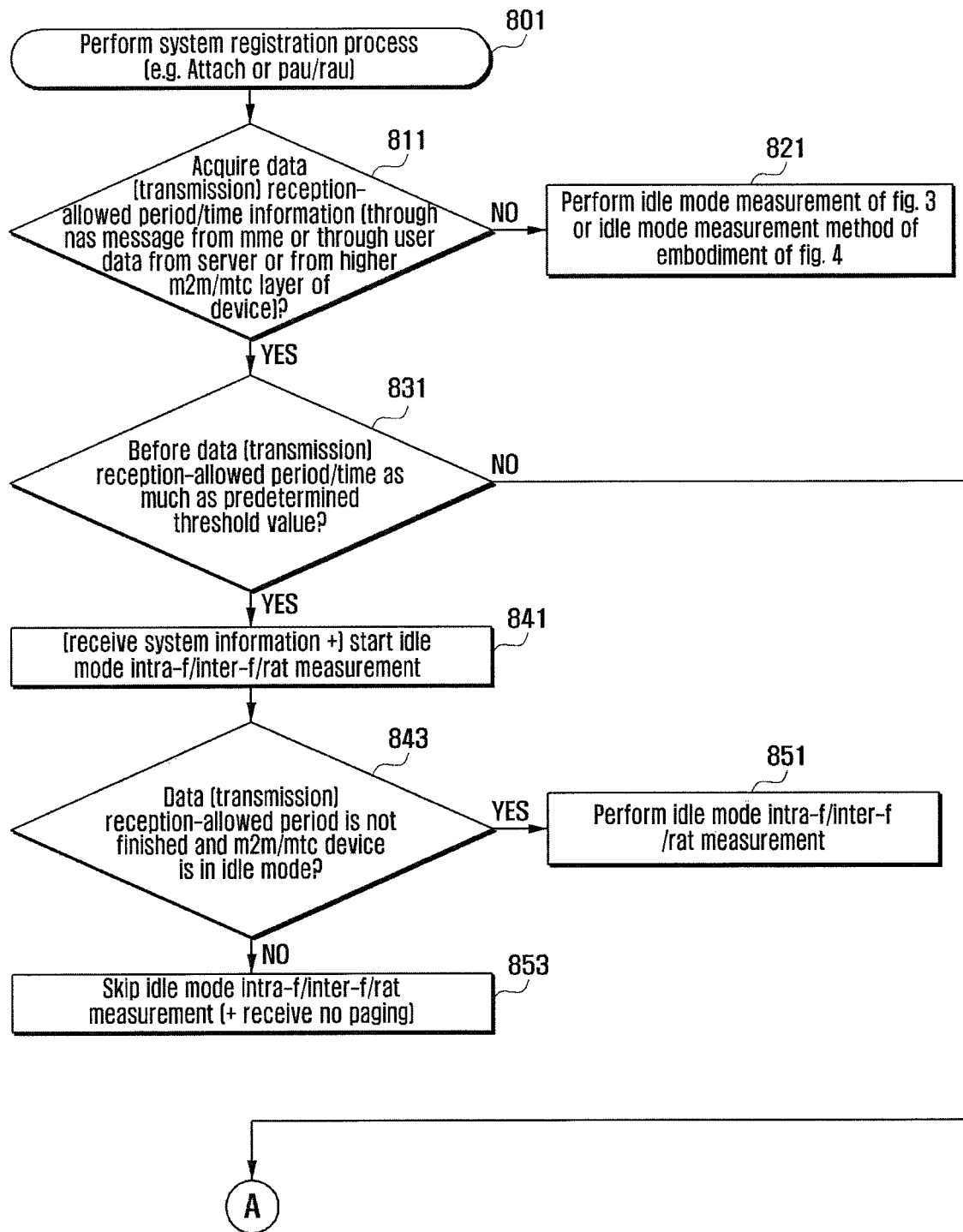
FIGS. 8a to 8b are a flowchart illustrating the procedure of the idle mode M2M/MTC device operating as in the embodiment of FIG. 7.
Figure 8B:
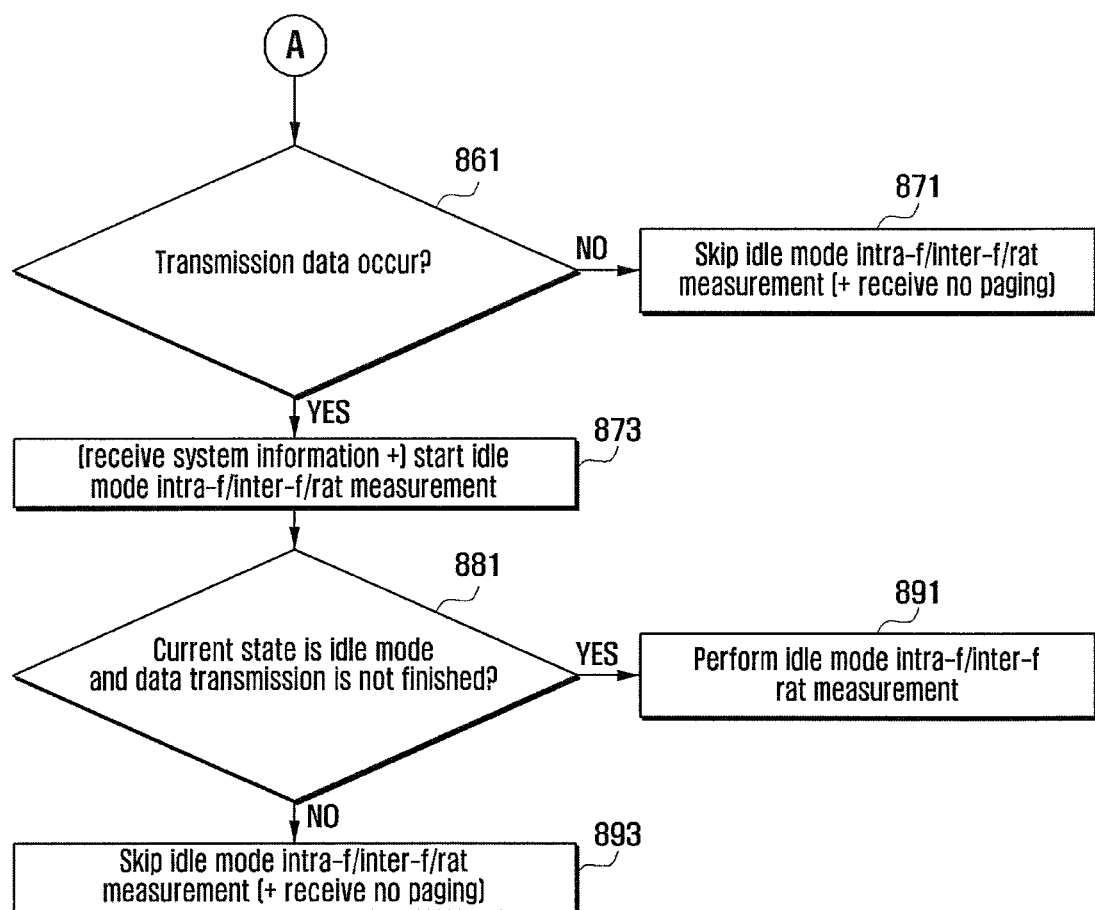

FIGS. 8a to 8b are a flowchart illustrating the procedure of the idle mode M2M/MTC device operating as in the embodiment of FIG. 7. The flowchart of the network operation in the embodiment of FIG. 7 can be applied to the conventional network operation described with reference to FIGS. 3a to 3c or the network operation of the embodiment of FIGS. 4a to 4c.

Referring to FIGS. 8a to 8b, the M2M/MTC device performs registration process with the UMTS mobile communication system or the LTE mobile communication system at step 801. After the system registration process, the M2M/MTC device determines whether the data (transmission) reception-allowed period/time information of the M2M/MTC device is acquired. The registration process with the mobile communication system can be the ATTACH process of the LTE mobile communication system, Routing Area Update (RAU) process of the UMTS mobile communication system, the Tracking Area Update (TAU) process of the LTE mobile communication system. The ATTACH process starts when the terminal powers on to register the terminal with the mobile communication system, acquire IP address, and establish Packet Data Network (PDN) connection; and the RAU/TAU process is performed when the terminal registers with a specific paging area for receiving the paging signal. The information on the data (transmission) reception-allowed period/time of the M2M/MTC device is acquired from the Non-Access Stratum (NAS) control message transmitted by the MME or the data transmitted by a network server or the higher layer of the M2M/MTC device (e.g. application layer). If no data (transmission) reception-allowed period/time of the M2M/MTC device is configured at step 811, the M2M/MTC device performs intra-frequency/inter-frequency/inter-RAT measurement according to the idle mode measurement method depicted in FIGS. 3a to 3c or the idle mode measurement method proposed in the embodiment of FIGS. 4a to 4c a step 821. Otherwise, if the data (transmission) reception-allowed period/time of the m2a device is configured at step 811, the M2M/MTC device determines whether it is the time before the start of the data (transmission) reception-allowed period/time as much as predetermined threshold time (e.g. N1 seconds) at step 831. The predetermined threshold time value can be transmitted form the network to the M2M/MTC device or a fixed value defined in the standard. If it is the time before the start of the data (transmission) reception-allowed period/time as much as the threshold time at step 831, the M2M/MTC device receives the system information of the cell and starts idle mode intra-frequency/inter-frequency/inter-RAT measurement based on the system information at step 841. Next, the M2M/MTC device repeats steps 843 and 851 to continue the idle mode intra-frequency/inter-frequency/inter-RAT measurement until the data (transmission) reception-allowed period/time ends. If it transitions from the idle mode to the RRC connected mode in the middle of the data (transmission) reception-allowed period/time, the M2M/MTC device detects this at step 843 and suspends the idle mode intra-frequency/inter-frequency/inter-RAT measurement for the RRC connection mode at step 853. If the data (transmission) reception-allowed period/time expires during the repetition of steps 843 and 851, the M2M/MTC device detects this at step 843 and suspends the idle mode intra-frequency/inter-frequency/inter-RAT measurement and the paging message reception at step 853. The intra-frequency/inter-frequency/inter-RAT measurement of the idle mode M2M/MTC device can be performed according to the measurement method of FIGS. 3a to 3c or the measurement method proposed in the embodiment of the present invention which is depicted in FIGS. 4a to 4c or a periodic intra-frequency/inter-frequency/inter-RAT measurement can be performed for the simplicity sake.

If it is not the time before the start of the data (transmission) reception-allowed period/time as much as the threshold time at step 831, the M2M/MTC device performs the operations of step 861 and later. At this time, as far as no data occurs in the range out of the data (transmission) reception-allowed period/time, the M2M/MTC device suspends the idle mode intra-frequency/inter-frequency/inter-RAT measurement while performing steps 861 and 871. Also, there is no need of the paging message reception check. If data to be transmitted by the M2M/MTC device occurs in the range out of the data (transmission) reception-allowed period/time of the M2M/MTC device, the M2M/MTC device detects this at step 861 and performs the idle mode intra-frequency/inter-frequency/inter-RAT measurement based on the system information received from the cell since the time when the data to be transmitted has occurred at step 873. Afterward, if the data transmission does not finish in the idle mode state while performing steps 881 and 891, the M2M/MTC device continues the idle mode intra-frequency/inter-frequency/inter-RAT measurement. However, if the M2M/MTC device transitions to the RRC connected mode or the data transmission finishes at step 881, the M2M/MTC device suspends the idle mode intra-frequency/inter-frequency/inter-RAT measurement at step 893. The intra-frequency/inter-frequency/inter-RAT measurement of the idle mode M2M/MTC device can be performed according to the measurement method of FIGS. 3a to 3c or the measurement method proposed in the embodiment of the present invention which is depicted in FIGS. 4a to 4c or a periodic intra-frequency/inter-frequency/inter-RAT measurement can be performed for the simplicity sake.

Figure 9:
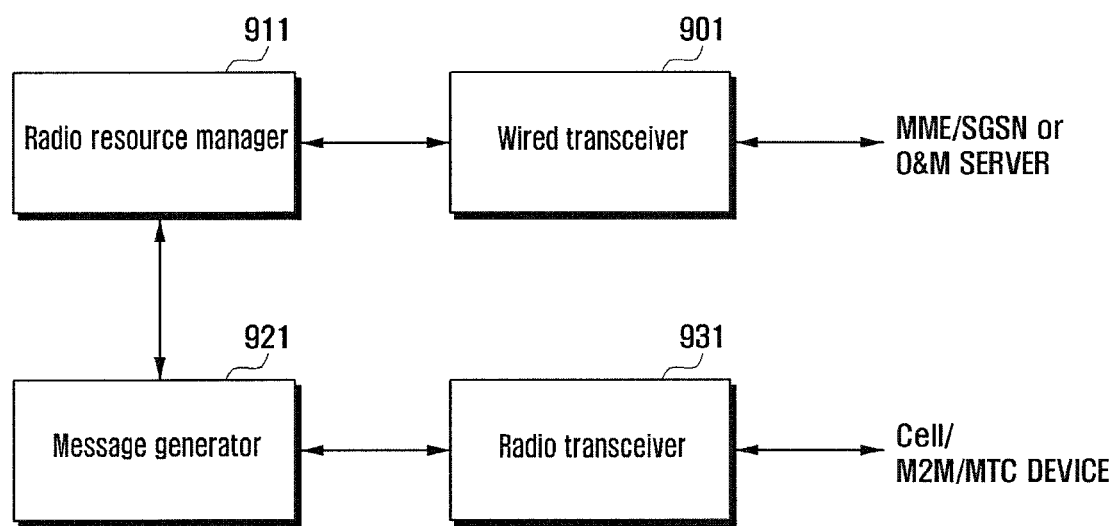
FIG. 9 is a block diagram illustrating a configuration of the network apparatus for performing the operations of FIGS. 4a to 4c and 7 according to an embodiment of the present invention.

FIG. 9 is a block diagram illustrating a configuration of the network apparatus for performing the operations of FIGS. 4a to 4c and 7 according to an embodiment of the present invention. FIG. 9 shows an exemplary configuration of the RNC of the 3GPP UMTS mobile communication system and eNB of the LTE mobile communication system.

Referring to FIG. 9, a wired transceiver 901 provides an interface responsible for wired connection with MME, SGSN, and O&M server for wire line communication. The radio resource manager 911 analyzes the information received by the wired transceiver 901 and allocates radio resource. The message generator 921 generates a message indicating the allocated message, and the radio transceiver 931 transmits the generated message to the cell or the M2M/MTC device. The base station apparatus according to an embodiment of the present invention includes a radio resource manager 911 for managing the resource of a set of a limited number of cells where the mobility of the M2M/MTC devices with low mobility is predicted, a message generator 921 for generating the system information with the normal measurement information of the idle mode M2M/MTC devices with low mobility and additional measurement triggering intra-frequency/inter-frequency/inter-RAT measurement, and a radio transceiver 931 for broadcasting the system information including the basic measurement information and additional measurement information.

A description is made of the operations for transmitting the system information from the base station system structured as shown in FIG. 9 to the M2M/MTC device according to an embodiment of the present invention. If the wired transceiver 901 connected to the MME or SGSN receives the information on the number of M2M/MTC devices with low mobility per location or the information on the idle mode measurement configuration of the M2M/MTC device, the radio resource manager 911 analyzes the information received by the wired transceiver 901 to configure the parameter values for the measurement of the M2M/MTC device with low mobility, the message generator 921 generates a message carrying the system information including the parameter values configured by the radio resource manager 911, and the radio transceiver 931 broadcasts the generated message in order for the M2M/MTC devices to receive the message within the cell.

Figure 10:
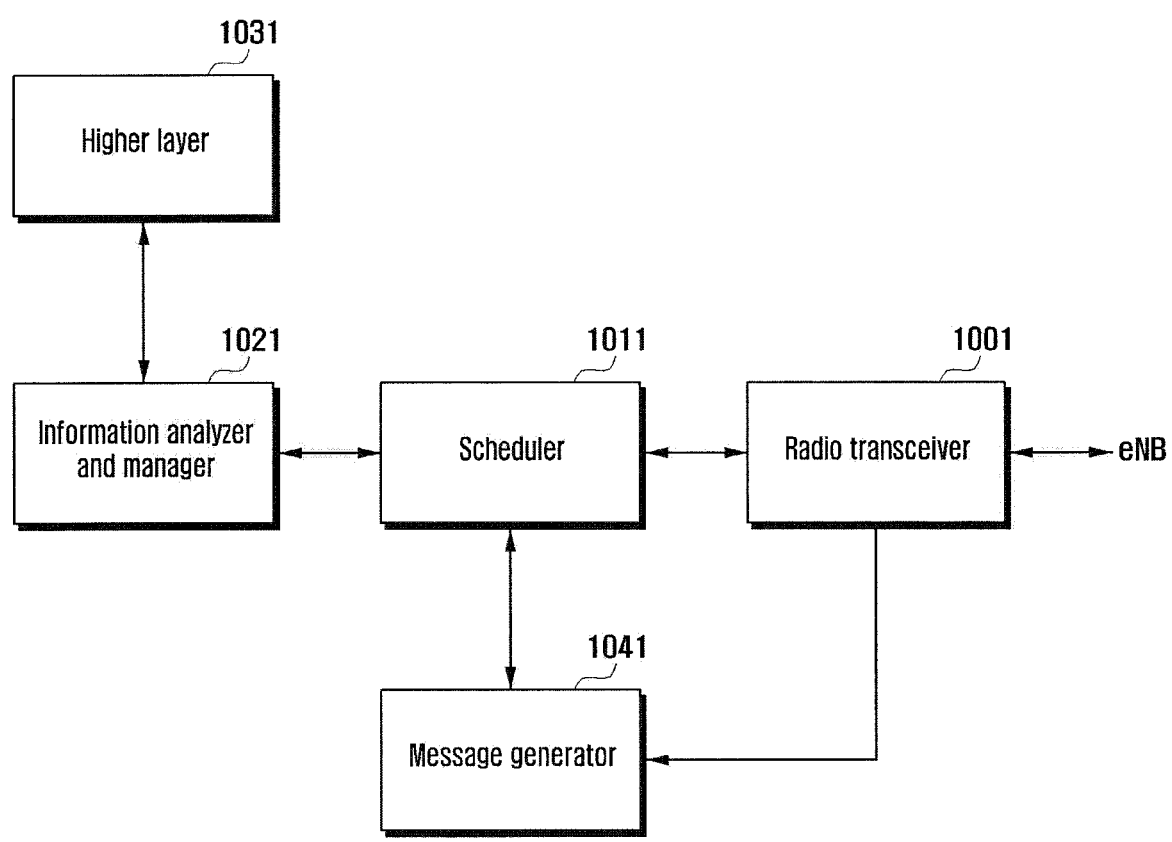
FIG. 10 is a block diagram illustrating a configuration of the M2M/MTC device according to the embodiment of FIGS. 4a to 4c and 7.

FIG. 10 is a block diagram illustrating a configuration of the M2M/MTC device according to the embodiment of FIGS. 4a to 4c and 7.

Referring to FIG. 10, if the information on its type of the M2M/MTC device with low mobility and the information on a small number of cells that might be limited by the mobility are acquired, the information analyzer and manager 1021 analyzes and manages the received information. If the system information acquired by the radio transceiver 101 includes the information related to the idle mode measurement for the M2M/MTC device with low mobility, the information analyzer and manager 1021 analyzes the received information and delivers the analysis result to the scheduler. The scheduler 1011 controls the measurement unit 1041 to perform measurement operation. If the (transmission) reception-allowed period/time information is acquired from the higher layer 1031 or through higher layer message, the M2M/MTC device analyzes and manages this information by means of the information analyzer and manager 1021 and delivers the analysis result to the scheduler 1011. The scheduler controls the measurement unit 1041 to perform the measurement operation.

While embodiments of the present invention have been shown and described in the specification and drawings to illustrate and explain the present invention, it should be understood that the present invention is not limited to these specific embodiments. That is, it is obvious to those skilled in the art that various changes and modification may be made therein without departing from the technical concept of the invention.

What is claimed is:

1. A method by a terminal in a wireless communication system, the method comprising:
    receiving, from a core network entity, a message including time value for the terminal;
    starting a timer corresponding to the time value;

prohibiting a task associated with an idle mode in case that the timer expires, the task including monitoring a paging message;
identifying whether a mobile originated data is pending; and
performing the task associated with the idle mode in case that the mobile originated data is pending.

2. The method of claim 1, wherein the task further includes measuring a cell or receiving system information.

3. The method of claim 1, wherein the message is received during a registration procedure.

4. The method of claim 3, wherein the message includes an initial registration related message or a mobility update related message.

5. The method of claim 1, wherein the terminal includes a machine to machine (M2M) device or a machine type communication (MTC) device.

6. A terminal in a wireless communication system, the terminal comprising:
a transceiver; and
a controller coupled with the transceiver and configured to:
receive, from a core network entity, a message including time value for the terminal,
start a timer corresponding to the time value,
prohibit a task associated with an idle mode in case that the timer expires, the task including monitoring a paging message,
identify whether a mobile originated data is pending, and
perform the task associated with the idle mode in case that the mobile originated data is pending.

7. The terminal of claim 6, wherein the task further includes measuring a cell or receiving system information.

8. The terminal of claim 6, wherein the message is received during a registration procedure.

9. The terminal of claim 8, wherein the message includes an initial registration related message or a mobility update related message.

10. The terminal of claim 6, wherein the terminal includes a machine to machine (M2M) device or a machine type communication (MTC) device.

11. A method by a core network entity in a wireless communication system, the method comprising:
receiving, from a terminal, a first message; and
transmitting, to the terminal, a second message including time value for the terminal,
wherein a timer corresponding to the time value is started by the terminal,
wherein the timer is used for prohibiting a task associated with an idle mode in case that the timer expires, the task including monitoring a paging message, and
wherein the task associated with the idle mode is performed in case that the mobile originated data is pending.

12. The method of claim 11, wherein the task further includes measuring a cell or receiving system information.

13. The method of claim 11, wherein the second message is received during a registration procedure.

14. The method of claim 13, wherein the second message includes an initial registration related message or a mobility update related message.

15. The method of claim 11, wherein the terminal includes a machine to machine (M2M) device or a machine type communication (MTC) device.

16. A core network entity in a wireless communication system, the core network entity comprising:
a transceiver; and
a controller coupled with the transceiver and configured to:
receive, from a terminal, a first message, and
transmit, to the terminal, a second message including time value for the terminal,
wherein a timer corresponding to the time value is started by the terminal,
wherein the timer is used for prohibiting a task associated with an idle mode in case that the timer expires, the task including monitoring a paging message, and
wherein the task associated with the idle mode is performed in case that the mobile originated data is pending.

17. The core network entity of claim 16, wherein the task further includes measuring a cell or receiving system information.

18. The core network entity of claim 16, wherein the second message is received during a registration procedure.

19. The core network entity of claim 18, wherein the second message includes an initial registration related message or a mobility update related message.

20. The core network entity of claim 16, wherein the terminal includes a machine to machine (M2M) device or a machine type communication (MTC) device.

* * * * *